(12) United States Patent
Buell

(10) Patent No.: US 11,753,101 B2
(45) Date of Patent: Sep. 12, 2023

(54) ELECTRIC SADDLE TYPE VEHICLE WITH STORAGE AREAS

(71) Applicant: FUELL Inc., New York, NY (US)

(72) Inventor: Erik Buell, Mukwonago, WI (US)

(73) Assignee: FUELL Inc., New York, NY (US)

( * ) Notice: Subject to any disclaimer, the term of this patent is extended or adjusted under 35 U.S.C. 154(b) by 828 days.

(21) Appl. No.: 16/746,372

(22) Filed: Jan. 17, 2020

(65) Prior Publication Data

US 2020/0223504 A1    Jul. 16, 2020

Related U.S. Application Data

(63) Continuation-in-part of application No. 16/396,165, filed on Apr. 26, 2019, now Pat. No. 11,299,229.

(Continued)

(51) Int. Cl.
*B62J 9/14*        (2020.01)
*B62J 1/08*        (2006.01)
(Continued)

(52) U.S. Cl.
CPC ............... *B62J 9/14* (2020.02); *B62H 5/006* (2013.01); *B62J 1/08* (2013.01); *B62J 45/00* (2020.02);
(Continued)

(58) Field of Classification Search
CPC .... B62K 11/02; B62K 11/04; B62K 2204/00; B62J 1/04; B62J 1/08; B62J 1/12;
(Continued)

(56) References Cited

U.S. PATENT DOCUMENTS

| 4,830,134 A | 5/1989 | Hashimoto |
| 4,940,111 A | 7/1990 | Nogami et al. |

(Continued)

FOREIGN PATENT DOCUMENTS

| DE | 102015001959 A1 * | 8/2016 |
| EP | 1783039 A1 | 5/2007 |

(Continued)

OTHER PUBLICATIONS

Feb. 20, 2020—(WO) ISR & WO—App. No. PCT/US19/65038.
(Continued)

*Primary Examiner* — Minnah L Seoh
*Assistant Examiner* — Maurice L Williams
(74) *Attorney, Agent, or Firm* — Banner & Witcoff, Ltd.

(57) ABSTRACT

A motorcycle, or saddle type vehicle, is disclosed that may have at least one seat and at least two wheels, at least one hub electric motor. A large dry storage compartment may be positioned between the rider and steering mount. A rechargeable battery and battery management system may be located below the storage compartment in a battery housing, where the battery housing may be a structural component of the chassis. A rear electronics housing may be attached to and located behind the battery housing, and may contain major electrical components such as electric motor controller and contactors. Two structural members, or frame side rails, may form sides of the storage compartment and extend between the electronics housing and steering mount. The electronics housing may also connect to the battery housing such that the battery housing reinforces and strengthens the chassis, or structural frame. A secondary storage compartment may be located under the seat. Additionally, the storage compartments may have electronic locking mechanisms that are activated via a wireless connection to a remote electronic device.

17 Claims, 21 Drawing Sheets

Related U.S. Application Data

(60) Provisional application No. 62/823,813, filed on Mar. 26, 2019, provisional application No. 62/812,156, filed on Feb. 28, 2019, provisional application No. 62/812,166, filed on Feb. 28, 2019, provisional application No. 62/793,670, filed on Jan. 17, 2019, provisional application No. 62/776,036, filed on Dec. 6, 2018, provisional application No. 62/663,803, filed on Apr. 27, 2018.

(51) Int. Cl.
*B62J 45/00* (2020.01)
*E05B 83/28* (2014.01)
*E05B 81/12* (2014.01)
*B62H 5/00* (2006.01)
*B62J 43/16* (2020.01)
*B60R 25/24* (2013.01)

(52) U.S. Cl.
CPC .............. *E05B 81/12* (2013.01); *E05B 83/28* (2013.01); *B60R 25/24* (2013.01); *B62J 43/16* (2020.02)

(58) Field of Classification Search
CPC ......... B62J 1/18; B62J 9/14; B62J 9/22; B62J 9/24; B62J 9/30; B62J 43/16; B62J 43/28; B62J 45/00; B62J 45/08; E05B 2047/0094; E05B 81/08; E05B 81/12; E05B 83/28; B62H 5/001; B62H 5/006
See application file for complete search history.

(56) References Cited

U.S. PATENT DOCUMENTS

| | | | |
|---|---|---|---|
| 5,020,625 A | 6/1991 | Yamauchi et al. | |
| 5,127,560 A | 7/1992 | Miyamoto et al. | |
| 5,127,561 A | 7/1992 | Miyamoto | |
| 5,147,077 A | 9/1992 | Nakajima et al. | |
| 5,291,067 A | 3/1994 | Nakajima et al. | |
| 5,388,660 A | 2/1995 | Shirasagi et al. | |
| 6,687,592 B2 | 2/2004 | Grob et al. | |
| 7,446,222 B2 | 11/2008 | Bit et al. | |
| 7,931,110 B2 | 4/2011 | Nishiura et al. | |
| 8,002,067 B2 | 8/2011 | Nishiura et al. | |
| 8,265,814 B2 | 9/2012 | Cominetti | |
| 8,360,188 B2 | 1/2013 | Yonehana et al. | |
| 8,453,782 B2 | 6/2013 | Kondo et al. | |
| 8,455,128 B2 | 6/2013 | Belton | |
| 8,485,299 B2 | 7/2013 | Iida | |
| 8,627,916 B2 | 1/2014 | Shinde et al. | |
| 8,662,229 B2 | 3/2014 | Nakagome et al. | |
| 8,672,077 B2 | 3/2014 | Sand et al. | |
| 8,783,405 B2 | 7/2014 | Irie et al. | |
| 8,789,640 B2 | 7/2014 | Matsuda | |
| 8,915,325 B2 | 12/2014 | Kikuchi | |
| 8,919,482 B2 | 12/2014 | Matsuda | |
| 8,957,618 B2 | 2/2015 | Tadano et al. | |
| 9,193,410 B2 | 11/2015 | Watanabe et al. | |
| 9,211,934 B2 | 12/2015 | Eguchi | |
| 9,216,787 B2* | 12/2015 | Duncan | B62J 43/23 |
| 9,242,599 B2 | 1/2016 | Shimizu et al. | |
| 9,394,024 B2* | 7/2016 | Maeda | B62J 7/06 |
| 9,415,691 B2 | 8/2016 | Murakami et al. | |
| 9,415,821 B2 | 8/2016 | Oishi et al. | |
| 9,434,441 B1 | 9/2016 | Sand | |
| 9,493,206 B1* | 11/2016 | Oh | B62K 3/002 |
| 9,551,403 B2 | 1/2017 | Kakemizu et al. | |
| 9,963,184 B2 | 5/2018 | Inoue | |
| 10,046,667 B2* | 8/2018 | Orimo | H01M 50/204 |
| 10,322,768 B2* | 6/2019 | Morotomi | B62J 43/30 |
| 10,427,541 B2* | 10/2019 | Yamamoto | B62M 7/00 |
| 10,464,497 B2* | 11/2019 | Kondo | E05F 15/611 |
| 10,464,633 B2* | 11/2019 | Zhu | B62M 11/02 |
| 10,696,350 B2* | 6/2020 | Futamata | B62K 19/46 |
| 10,850,790 B2* | 12/2020 | Kudo | B62K 11/04 |
| 11,192,604 B2* | 12/2021 | Carmignani | B62M 23/02 |
| 2004/0036609 A1 | 2/2004 | Kojika et al. | |
| 2004/0118889 A1 | 6/2004 | Hamilton | |
| 2004/0214680 A1 | 10/2004 | Schoon | |
| 2008/0246315 A1 | 10/2008 | Ito | |
| 2011/0175467 A1 | 7/2011 | Belton | |
| 2011/0186400 A1 | 8/2011 | Villeneuve | |
| 2011/0233994 A1 | 9/2011 | Harding et al. | |
| 2012/0000720 A1 | 1/2012 | Honda et al. | |
| 2012/0082881 A1 | 4/2012 | Tsukamoto et al. | |
| 2012/0138375 A1 | 6/2012 | Hughes | |
| 2012/0199409 A1 | 8/2012 | Nakamura et al. | |
| 2012/0234619 A1 | 9/2012 | Nakagome et al. | |
| 2013/0162009 A1 | 6/2013 | Mitts et al. | |
| 2013/0257374 A1 | 10/2013 | Ichikawa et al. | |
| 2013/0282219 A1 | 10/2013 | Matsuda | |
| 2013/0292198 A1 | 11/2013 | Matsuda | |
| 2013/0299265 A1 | 11/2013 | Marazzi | |
| 2014/0027193 A1 | 1/2014 | Annaberger et al. | |
| 2014/0297074 A1 | 10/2014 | Lee et al. | |
| 2014/0297079 A1 | 10/2014 | Saitoh | |
| 2014/0305729 A1 | 10/2014 | Testoni et al. | |
| 2015/0008061 A1 | 1/2015 | Matsuda | |
| 2015/0042160 A1* | 2/2015 | Matsuda | B62J 43/16 307/10.3 |
| 2015/0075889 A1 | 3/2015 | Eguchi | |
| 2015/0122563 A1* | 5/2015 | Kondo | B62J 43/16 180/68.5 |
| 2015/0232150 A1 | 8/2015 | Kosuge et al. | |
| 2015/0258898 A1 | 9/2015 | Matsuda | |
| 2015/0329011 A1 | 11/2015 | Kawai | |
| 2015/0329176 A1 | 11/2015 | Inoue | |
| 2015/0375596 A1 | 12/2015 | Blain et al. | |
| 2016/0039489 A1 | 2/2016 | Platz | |
| 2016/0200381 A1* | 7/2016 | Lorbiecki | B62J 1/12 297/215.14 |
| 2016/0214677 A1 | 7/2016 | Mizuta et al. | |
| 2016/0347281 A1* | 12/2016 | Wu | H01M 10/482 |
| 2017/0113634 A1 | 4/2017 | Tanaka et al. | |
| 2017/0282989 A1* | 10/2017 | Niijima | B62J 1/12 |
| 2018/0050593 A1 | 2/2018 | Gherardi et al. | |
| 2018/0099675 A1 | 4/2018 | Boisvert et al. | |
| 2018/0154974 A1* | 6/2018 | Toyota | B62K 21/00 |
| 2018/0215437 A1 | 8/2018 | Kurabayashi | |
| 2018/0215440 A1 | 8/2018 | Omosako | |
| 2019/0305276 A1 | 10/2019 | Suzuki et al. | |
| 2019/0329836 A1 | 10/2019 | Buell | |
| 2020/0180577 A1 | 6/2020 | Buell et al. | |
| 2020/0223504 A1* | 7/2020 | Buell | B62J 45/00 |
| 2020/0269942 A1* | 8/2020 | Kondo | B62J 1/08 |
| 2020/0398918 A1 | 12/2020 | Buell et al. | |

FOREIGN PATENT DOCUMENTS

| | | | | |
|---|---|---|---|---|
| EP | 2130751 A1 | | 12/2009 | |
| EP | 3450296 A1 | * | 3/2019 | ............... B62H 1/02 |
| IT | TO20030942 A1 | | 6/2004 | |
| JP | 2017081486 A | | 5/2017 | |
| WO | 2011/101908 A1 | | 8/2011 | |

OTHER PUBLICATIONS

Apr. 6, 2020—(WO) ISR & WO—App. No. PCT/US2020/014158.
Honda-Pro Kevin, "2016 Honda NC700X DCT ABS Review / Specs / Pictures & Videos," visited May 3, 2018, at http://www.hondaprokevin.com/motorcycles-models/2016/honda-nc700x-dct-abs-review-specs-nc700xdg-adventure.
Bennetts, "Honda NC750X (2016): First Ride and Review!", visited May 3, 2018, at https://www.bennetts.co.uk/bikesocial/reviews/bikes/honda/honda-nc750x-2016.
Erik Buell et al., "EMN Short Newsflash | First New Designs from VanguardSpark with Erik Buell," visited Apr. 27, 2018 at <https://electricmotorcycles.news/emn-short-newsflash-first-new-designs-from-vanguardspark-with-erik-buell/>.
Photograh for "Helmet Storage".

(56) References Cited

OTHER PUBLICATIONS

Jul. 11, 2019—(WO) ISR and WO—App. No. PCT/US19/29458.
Aug. 12, 2020—(WO) ISR & WO—App. No. PCT/US20/20397.

* cited by examiner

ELECTRIC SADDLE TYPE VEHICLE WITH STORAGE AREAS

CROSS-REFERENCE TO RELATED APPLICATIONS

The application is a continuation-in-part of U.S. patent application Ser. No. 16/396,165 filed on Apr. 26, 2019, which claims priority to U.S. Provisional Application No. 62/663,803 filed on Apr. 27, 2018, U.S. Provisional Application No. 62/776,036 filed on Dec. 6, 2018, U.S. Provisional Application No. 62/793,670 filed on Jan. 17, 2019, U.S. Provisional Application No. 62/812,156 filed on Feb. 28, 2019, U.S. Provisional Application No. 62/812,166 filed on Feb. 28, 2019, and U.S. Provisional Application No. 62/823,813 filed on Mar. 26, 2019. All of the above referenced applications are incorporated by reference in their entirety.

FIELD OF INVENTION

This disclosure generally relates to an electric vehicle, more specifically, aspects relate to a saddle type vehicle.

BACKGROUND

Although there have been many electric motorcycle, or a saddle type vehicle, products proposed and a number are in production, most of the products follow a conventional perspective of a motorcycle by replacing an internal combustion engine with an electric motor and attaching a battery much as a fuel tank would be added to a conventional motorcycle. These products also may integrate the electric motor as a part of the chassis much like an internal combustion motor is often used as a chassis component on a conventional motorcycle. As other options, the products may be designed for quick removal of battery packs to enable recharging indoors, while some may be designed to protect the batteries for use off road, where shorter travel distances make electric motorcycles a more viable option.

The unique clean operation of electric vehicles is highly desirable in urban areas, and use of two wheelers is seen in urban areas due to traffic flow and parking considerations. Indeed, the limited range of batteries and a recharging infrastructure in its infancy make urban areas the ideal location for electric two wheelers. The concerns of urban use in highly populated areas for increased potential theft of vehicle, goods in storage areas, and vandalism of the charge port, as well as possible electrical injury may need to be minimized.

BRIEF SUMMARY

The disclosure may relate to a chassis design for a motorcycle and more specifically to a motorcycle frame structure, which includes the battery housing as a structural member, encloses a large dry storage area between upper frame rails and the battery housing. This design may locate the battery weight as low and forward as possible for optimum weight distribution, while also enclosing the batteries and electronics in a structural box, which adds substantial stiffness and strength to the frame assembly. With this type of structural battery housing attached to the bottom of the frame rails, these main frame rails can be narrow in cross-section and widely spaced apart, thus leaving a large storage space above the battery housing and in front of the rider. This frame utilizes two parallel beam-like structural members of that have a cross-sectional profile with a vertical height that is greater than a horizontal width on each side of the storage area that is located between upper chassis members between the front and rear wheel suspension. These side structural members may be attached in the front to a steering mount structure to which the steering apparatus and front suspension are attached, and at the rear to a vertical oriented electronics housing structure to which the seat support and the rear suspension are mounted. In addition, the battery housing structure may be attached at the bottom of the frame beam-like structural members, in front of the rear electronics housing structure and below of the front frame structure of the steering mount structure and structural members.

Other aspects of this disclosure may relate to a motorcycle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side. The chassis may also have a battery housing connected to and positioned below the first and second structural members, where the battery housing is configured to contain at least one battery, where a storage compartment is formed above the battery housing and between the first structural member and the second structural member. The storage compartment may form an enclosed volume, where the storage compartment includes a bottom surface formed by a top surface of the battery housing, a first side surface formed by an inner surface of the first structural member, a second side surface formed by an inner surface of the second structural member, a rear surface formed by a forward surface of the electronics housing, and a top surface formed by a storage compartment cover. The enclosed volume of the storage compartment may be within a range of 30 liters and 60 liters. The battery housing may comprise a first side member and a second side member opposite the first side member, where the first side member and the second side member when connected together form a hollow interior. An exterior surface of the battery housing may be exposed. The electronics housing may contain electrical component, such as a charging port, where the charging port is accessed by opening a bodywork door, by opening the storage compartment cover, or by lifting a seat or a portion thereof. The storage compartment may be accessed by opening a storage compartment cover positioned in front of a seat. The battery housing may also contain a battery management system, a DC/DC converter, and a charging member. In some embodiments, the storage compartment may have a fitted liner inserted between the first structural member and the second structural member. The first structural member and the second structural member may be beams with a C-shaped cross-section. In other embodiments, the first structural member and the second structural member that may be formed from tubes welded together.

Still other aspects of this motorcycle chassis may further comprise a swingarm connected to the electronics housing, where the swingarm extends rearward of the electronics housing and is configured to support a rear wheel, and where the electronics housing is connected to a rear surface of the battery housing. The battery housing may include an environmental seal. The top surface of the battery housing may have a pair of extensions protruding vertically from the top surface, where a first extension of the pair of extensions engages and connects to the first structural member and a second extension of the pair of extensions engages and connects to the second structural member.

Additional aspects of this disclosure may relate to a saddle type vehicle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side, a battery housing connected to and positioned below the first and second structural members, wherein the battery housing is configured to contain at least one battery, wherein the battery housing includes a front wall, a rear wall opposite the front wall, a top wall extending rearward from the front wall, a bottom wall extending rearward from the front wall opposite the top wall, a first side wall extending between the top wall and the bottom wall, and a second side wall extending between the top wall and the bottom wall opposite the first side wall; wherein the electronics housing is connected to the rear wall of the battery housing. The chassis may further comprise a swingarm connected to the electronics housing, where the swingarm extends rearward of the electronics housing and is configured to support a rear wheel; and a storage compartment formed above the battery housing and between the first structural member and the second structural member, where the storage compartment forms an enclosed volume, and wherein the storage compartment includes a bottom surface comprising a top surface of the battery housing, a first side surface formed by an inner surface of the first structural member, a second side surface formed by an inner surface of the second structural member, a rear surface formed by a forward surface of the electronics housing, and a top surface formed by a storage compartment cover. Each of the first structural member and the second structural member may have a substantially C-shaped cross-section. The top wall of the battery housing has a pair of extensions protruding vertically above the top wall, wherein a first extension of the pair of extensions engages and connects to the first structural member and a second extension of the pair of extensions engages and connects to the second structural member. The enclosed volume of the storage compartment is within a range of 30 liters and 60 liters. A seat support structure may be connected to the electronics housing.

This disclosure may have further aspects related to a structural frame for a saddle type vehicle comprising a steering mount structure at a front side of the frame, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a left side of the frame and the second structural member is on a right side of the frame. The structural frame may also include a battery housing connected to and positioned below the first and second structural members, where the battery housing is configured to contain at least one battery. The battery housing may include a front wall, a rear wall opposite the front wall, a top wall extending rearward from the front wall, a bottom wall extending rearward from the front wall opposite the top wall, a left side wall extending between the top wall and the bottom wall, and a right side wall extending between the top wall and the bottom wall opposite the left side wall; where the electronics housing is connected to the rear wall of the battery housing and where the front wall, the left side wall, and the right side wall have exposed portions. The structural frame may include a swingarm connected to the electronics housing, wherein the swingarm extends rearward of the electronics housing and is configured to support a rear wheel.

Additional aspects of this disclosure may relate to a saddle type vehicle that includes a battery housing connected to and positioned below first and second structural members, where the battery housing contains at least one electrical energy storage device such as a battery or capacitor; a first storage compartment formed above the battery housing and between the first structural member and the second structural member, where the first storage compartment includes a cover and a first locking mechanism that has a first locked configuration and a first unlocked configuration. The saddle type vehicle may also include a seat positioned rearward of the first storage compartment, where a quick charge electrical port may be located under the seat. The seat may include a second locking mechanism that has a second locked configuration and a second unlocked configuration. When the second locking mechanism is in the second unlocked configuration, the seat may be moved rearward allowing the quick charge electrical port to be accessible. The second locking mechanism includes a first seat locking assembly that controls a first unlocked stage and a second seat locking assembly that controls a second unlocked stage, where the first unlocked stage may allow access to the quick charge electrical port, and the second unlocked stage may allow access to the quick charge electrical port and a second storage compartment located underneath the seat. When the first seat locking assembly is unlocked, the seat may be allowed to slide a predetermined distance rearward to provide access to the quick charge electrical port. The first seat locking assembly may include a first seat latch solenoid, a first seat latch, and a first seat actuator, where the first seat latch engages the seat, and the first seat latch solenoid controls the first seat latch.

Another aspect of this disclosure may be related to when the first seat latch is moved from the second locked configuration to the first unlocked stage of the second unlocked configuration, the first seat latch may be released from the first seat latch solenoid, and the first seat actuator may push the seat along a plurality of rails to expose the quick charge electric port. In addition, when the second seat locking assembly is unlocked, the seat may be allowed to slide a distance greater than the predetermined distance to allow access to the second storage compartment. The second seat lock assembly may include a second seat latch, a second seat latch solenoid, a latching door releasably engaged to the second seat latch, where the latching door may releasably engage a front seat axle located a bottom surface of the seat, and a second seat actuator connected to the seat. When the second seat lock assembly is moved from the second locked configuration to the second unlocked stage of the second unlocked configuration, the second seat latch solenoid may release the seat second latch which releases the latching door, where the latching door may release the front seat axle. The second seat actuator may exert a force on the seat. The second seat actuator may cause the seat to rotate upwards around a pivot axis located near a rear end of the seat. The second locking mechanism is moved from the first locked configuration to the first unlocked configuration using a remote electronic device, such that the saddle type vehicle communicates wirelessly with the remote electronic device.

This disclosure may further relate to a saddle type vehicle with a first storage compartment that operates in a manner when the first locking mechanism is in the first unlocked configuration, the cover may rotate about a cover hinge axis to allow access to the first storage compartment. The first locking mechanism may include a storage latch pin, a storage latch solenoid, a storage actuator, a cover hinge, and a mounting plate. When the first locking mechanism is moved from the first locked configuration to the first unlocked configuration, the storage latch solenoid may release the storage latch pin and the storage actuator pushes on a hinge plate of the cover hinge to rotate the cover about the cover hinge axis. The first storage compartment may be moved from the first locked configuration to the first unlocked configuration using a remote electronic device, such that the saddle type vehicle communicates wirelessly with the remote electronic device.

This disclosure may also relate to an electric saddle type vehicle that includes a steering mount structure, where the steering mount structure is configured to attach to a front suspension; a first structural member connected to and extending from a rear end of the steering mount structure to a front end of an electronics housing; a second structural member connected to and extending from the rear end of the steering mount structure to the front end of the electronics housing, where the first structural member is on a first side of the electric saddle type vehicle and the second structural member is on a second side of the electric saddle type vehicle; a seat support structure connected to the electronics housing; and a seat positioned above the seat support structure, wherein a quick charge electrical port is located below the seat, where the seat has a first locking mechanism that includes a first locked configuration and a first unlocked configuration. The first locking mechanism may include a first seat locking assembly that controls a first unlocked stage and a second seat locking assembly that controls a second unlocked stage, where the first unlocked stage allows access to the quick charge electrical port, and where the second unlocked stage allows access to the quick charge electrical port and a storage compartment located underneath the seat. When the first seat locking assembly is unlocked, the seat is allowed to slide a predetermined distance rearward to provide access to the quick charge electrical port. The first seat locking assembly may include a first seat latch solenoid, a first seat latch, and a first seat actuator, where the first seat latch engages the seat, and the first seat latch solenoid controls the first seat latch. When the first seat latch is moved from the first locked configuration to the first unlocked stage of the first unlocked configuration, the first seat latch may be released from the first seat latch solenoid, and the first seat actuator may push the seat along a plurality of rails to expose the quick charge electric port. The electric saddle type vehicle may further include a storage compartment formed above the battery housing, where the storage compartment includes a cover. The storage compartment may have a locking mechanism that has a locked configuration and an unlocked configuration, where the locking mechanism may include a storage latch pin, a storage latch solenoid, a storage actuator, a cover hinge, and a mounting plate. When the locking mechanism is moved from the locked configuration to the unlocked configuration, the storage latch solenoid may release the storage latch pin, and the storage actuator may push on a hinge plate of the cover hinge to rotate the cover upward about a cover hinge axis. The storage compartment is moved from the locked configuration to the unlocked configuration using a remote electronic device, such that the electric saddle type vehicle communicates wirelessly with the remote electronic device.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
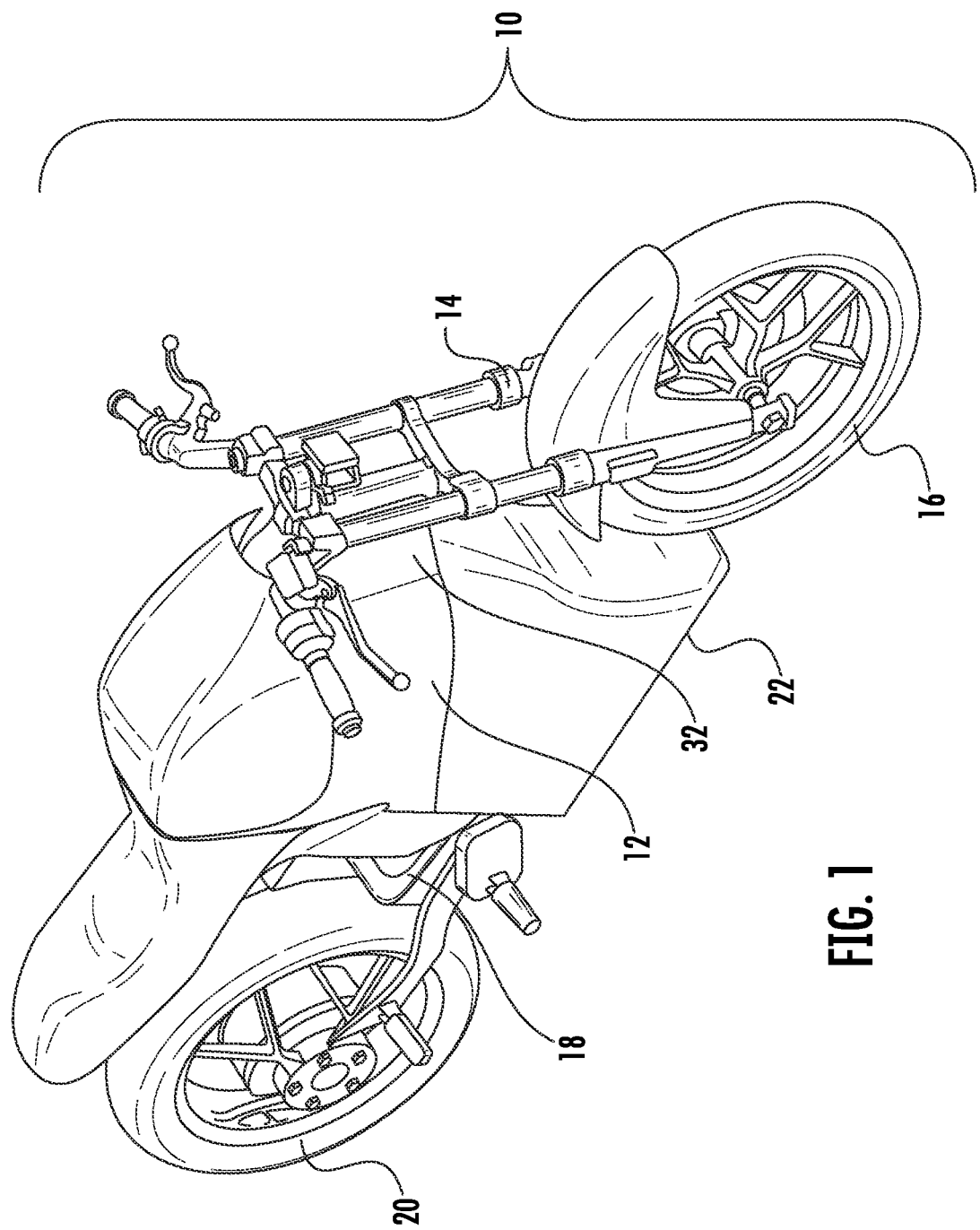
FIG. 1 illustrates a top front perspective view of an electric saddle type vehicle chassis according to aspects disclosed herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "attached," "fixed," "connected," "coupled," "positioned," "engaged" and similar terms, is meant to include both direct and indirect mounting, attaching, fixing, connecting, coupling, positioning and engaging.

Also, while the terms "top," "bottom," "front," "back," "left," "right," "side," "rear," "upward," "downward," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three-dimensional orientation of structures in order to fall within the scope of this disclosure. Also, the reader is advised that the attached drawings are not necessarily drawn to scale.

In general, this disclosure relates to an electric motorcycle, or saddle type vehicle, chassis that provides a large volume easy access dry storage for daily commuter/shopper use, while also providing as large battery capacity combined with an easy access port for quick recharging of the batteries.

As shown in the embodiment of FIGS. 1-4, the motorcycle chassis 12 may include a front steering mount structure 32 connected to a first structural member 24 on a first side of the chassis 12 and a second structural member 26 on a second side opposite the first structural member 24 opposite the first side of the chassis 12. The first and second structural members 24, 26 may be spaced apart from each other and may have portions that are substantially parallel to each other. In some embodiments the structural members 24, 26 may have a curved shape such that they converge toward each other near the front structure 32. The structural members 24, 26 may have a narrow width and tall height, such that the height may be greater than the width and comprise the left and right sides of the chassis 12 of the motorcycle 10. For instance, the structural members 24, 26 may have a cross-sectional profile where a ratio of the height to the width may be of approximately 6:1, or within a range of 4:1 and 8:1, or within a range of 3:1 and 10:1. A battery housing 22 may be connected to the structural members 24, 26 and may be positioned below structural members 24, 26. The battery housing 22 may be configured to contain a rechargeable electric energy storage system ("RESS"), which may include an electrical energy storage device, such as a battery or battery capacitor, and battery management system. The battery housing may also include a DC/DC converter and a charging member. The motorcycle 10 may include at least one hub electric motor that is connected to the battery or RESS. A storage compartment 100 may be formed above the battery housing 22 and between the first and second structural members 24, 26. The battery housing 22 may include hollow interior and may be attached to a bottom surface of said side members, (first and second structural members 24, 26) in multiple locations. The battery housing 22 and side members 24, 26 may be attached to a rear structural electronics housing 34, which may have a swingarm 18, the rear suspension 19, a rider seat support structure 17, and seat 28. In some embodiments, the battery housing 22 may be mounted to the front structure 32.

FIG. 1 illustrates a motorcycle 10 having the chassis 12. The chassis 12 may define the frame structure comprising the front structure 32 and the thin walled dual beam upper center structure 24, 26. The front structure 32 may connect to the front telescoping fork 14, or front suspension, that may bear front wheel 16 at the front end of the motorcycle 10. In addition, the frame structure may include the rear structure 34. The swingarm 18 may mount to the rear structure 34, where the swingarm 18 may bear rear wheel 20. Battery housing 22 may be attached in multiple locations beneath the structural members 24, 26 and/or between the substantially parallel beam members 24, 26 of dual beam frame structure. The battery housing 22 may also be attached in multiple locations to rear structure 34. The battery housing 22 may act as a structural reinforcement to help stiffen the chassis 12. Because the batteries, or RESS, may comprise a large percentage of the weight of the motorcycle 10, positioning battery housing 22, and the enclosed batteries, beneath the structural members 24, 26 helps to position the overall center of gravity of the motorcycle 10 in a low and forward position, which may improve handling and control of the motorcycle 10.

Figure 2:
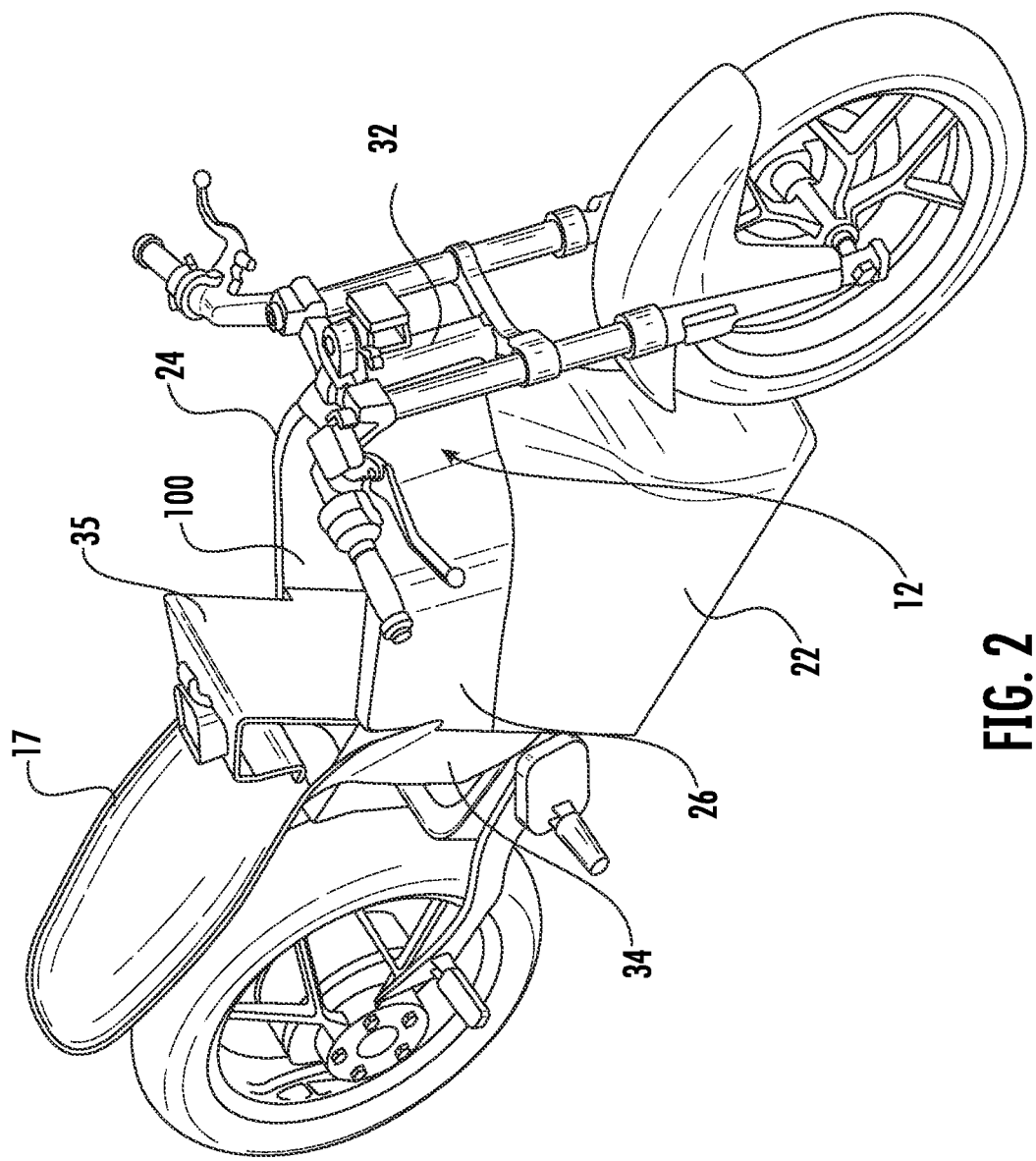
FIG. 2 illustrates a top front perspective view of the electric a saddle type vehicle chassis of FIG. 1 with the seat and cover removed for clarity according to aspects disclosed herein.
Figure 3:
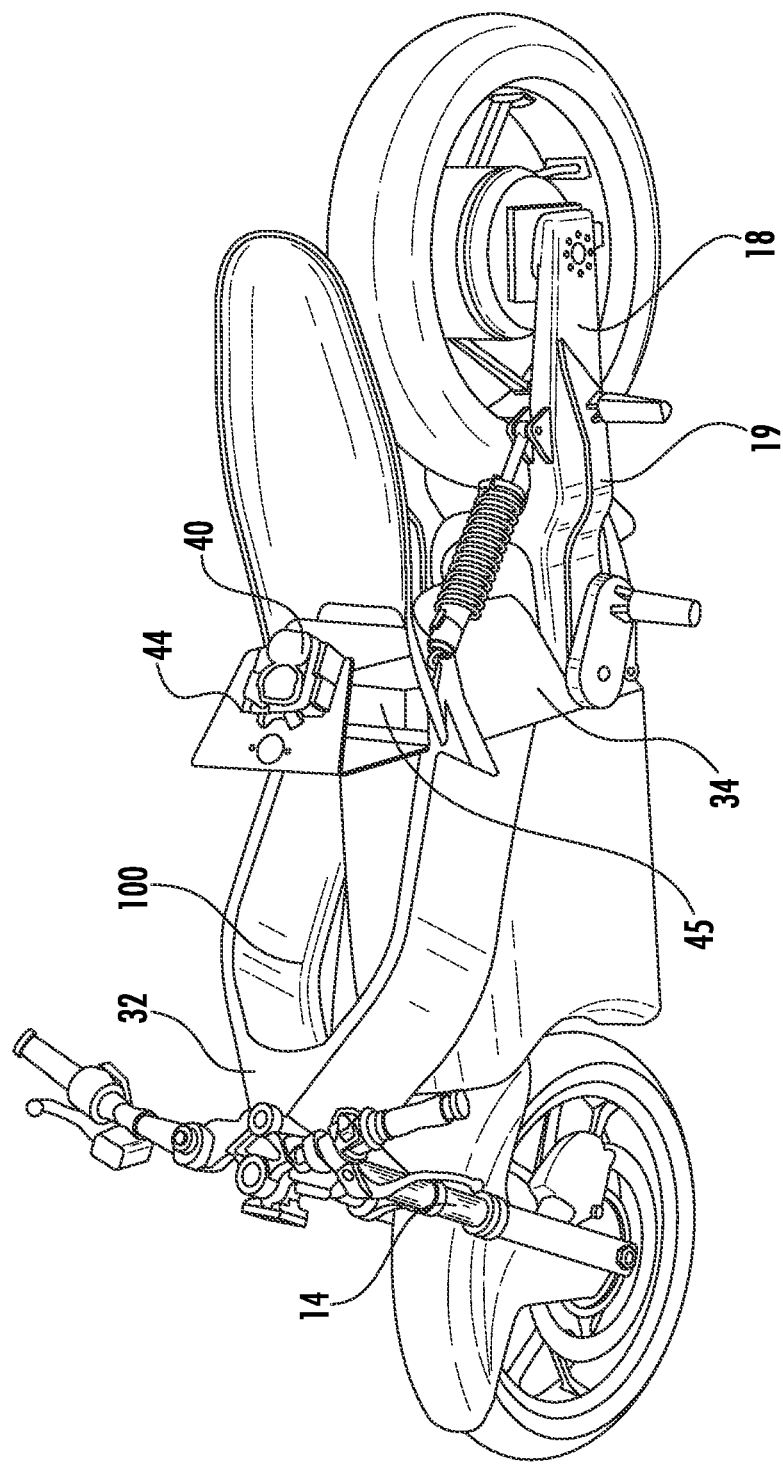
FIG. 3 illustrates a top side perspective view of the electric saddle type vehicle chassis of FIG. 1 with the seat and cover removed for clarity according to aspects disclosed herein.
Figure 4:
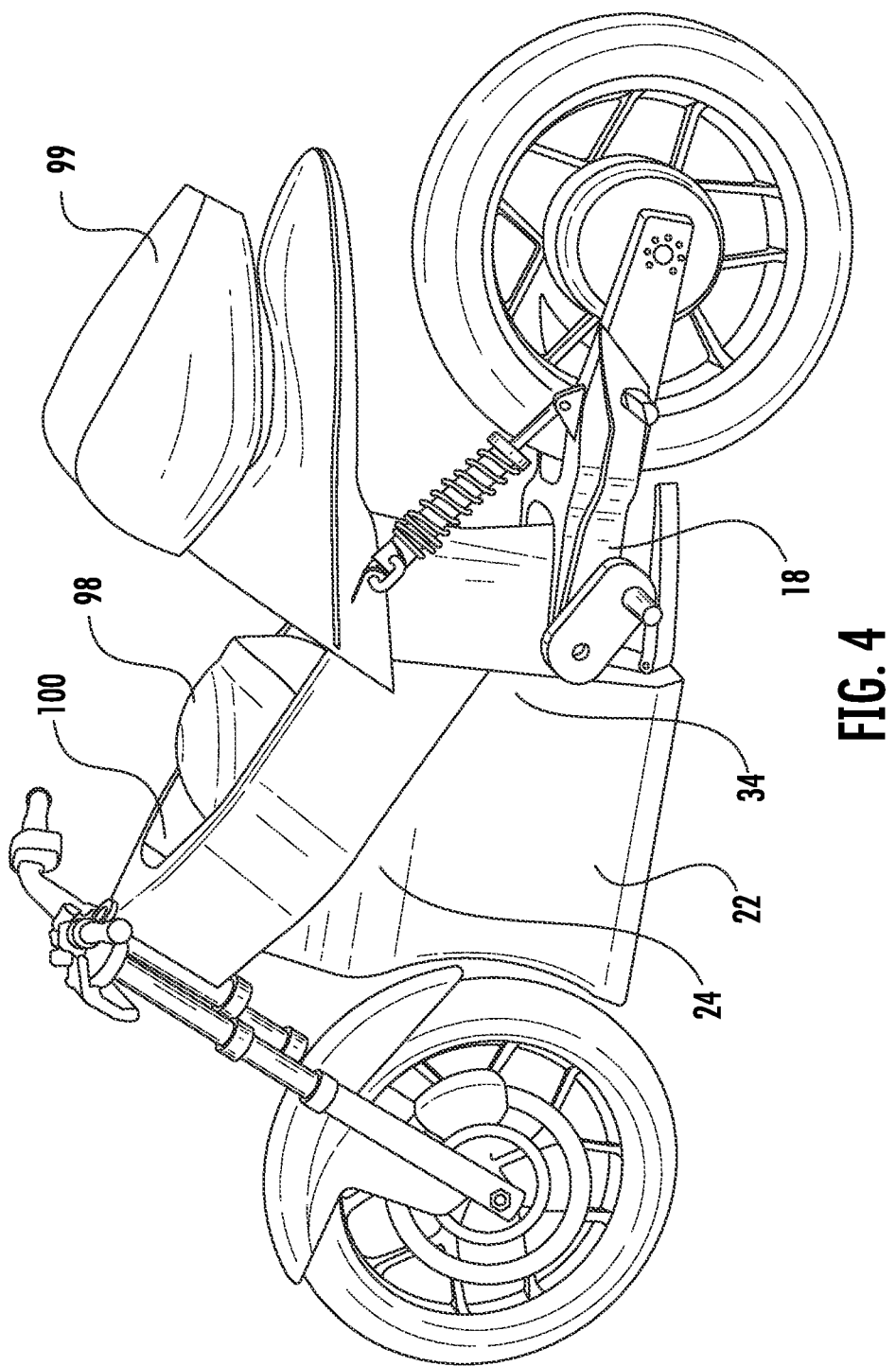
FIG. 4 illustrates a side perspective view of the electric saddle type vehicle chassis of FIG. 1 with the cover opened according to aspects disclosed herein.

As seen in FIGS. 2 and 3, a storage compartment 100 may be formed above battery housing 22 between structural members 24, 26. The storage compartment 100 may have a bottom surface formed by a top surface of battery housing 22, a left side surface formed by an inner surface of first beam member 24 and a right side surface formed by an inner surface of beam member 26, a rear surface may be formed by a forward surface of the electronics housing 34, and a top surface formed by an inner surface of cover 99. The battery housing 22 may add torsional and bending stiffness to the chassis 12, which may eliminate the need for any additional structure between frame rails 24, 26. This structure also may allow for a dry storage compartment 100 that can form an enclosed volume capable of holding large objects such as helmet 98 shown in FIG. 4. The volume of the storage compartment 100 may be approximately 50 liters, or may be within a range of 30 liters and 60 liters. Further, the storage compartment may have a vertical interior height at least 12 inches. The storage compartment cover 99 may be rotatably attached or hinged in front of the seat 28 such that when opened provides access to the storage compartment 100.

Figure 5:
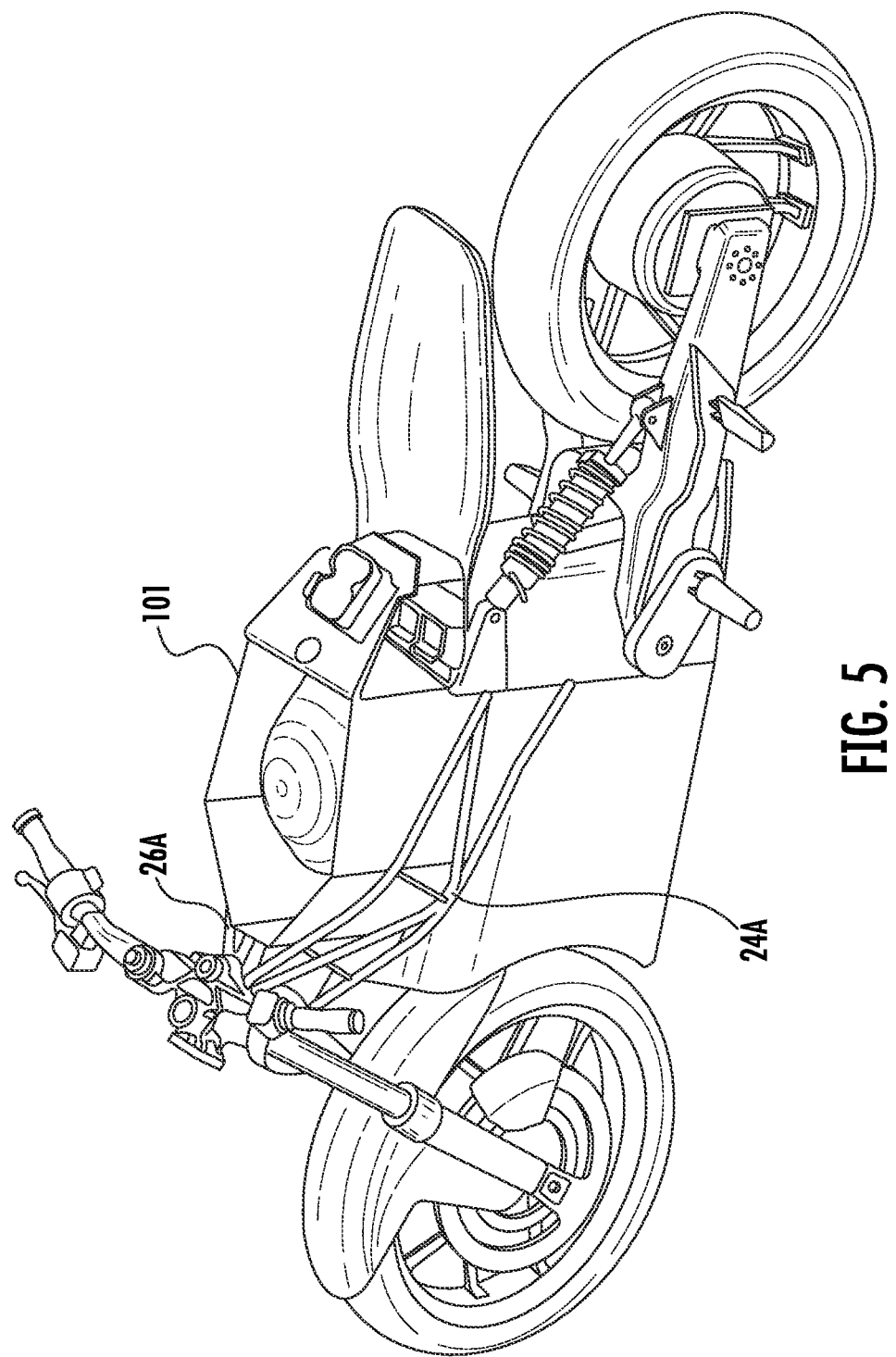
FIG. 5 illustrates a top side perspective view of an alternate embodiment of the electric saddle type vehicle chassis of FIG. 1 with the seat and cover removed for clarity according to aspects disclosed herein.

Each of beam members 24 and 26 may be attached at their front end to front structure 32 which supports the front suspension 14. The front structure 32 may be substantially V-shaped and include a receiver, or forward opening, for the front suspension 14 and a rear end with a pair of engaging members. Each of the structural members 24, 26 may be beams that have a substantially C-shaped cross-sectional shape, or alternatively, as shown in FIG. 5, the structural members 24, 26 may be formed from welded tubular side beam members 24A and 26A. In some embodiments, the storage compartment 100 may include an inner liner 101 to better define the enclosed dry storage volume 100.

The rear structure 34 may be in the form of a box-like casting, where the swingarm 18 and seat support structure 17 attach to the rear of the rear structure 34. As seen in FIG. 3 rear shock absorber 19 may be attached at one end to swingarm 18 and on the other end to rear structure 34. The rear structure 34 may be provided with a front cover plate 35. The electric motor controller 45 and other electronic components may be mounted to the front cover plate 35. Other electrical components maybe contained in the interior of rear structure 34, such as a high voltage relay.

The rear of battery housing 22 may be attached at the front of electronic housing 34, and the top wall of battery housing 22 may be attached to the bottom of beams 24 and 26. In some embodiments, the top front portion of the battery housing 22 may be connected to the front structure 32. Rear structure cap 44 may be mounted on top of rear structure 34 and include a quick charge port 40 which connects to the high voltage ground and to an electrical contact or similar component inside the electronics housing 34.

Figure 6:
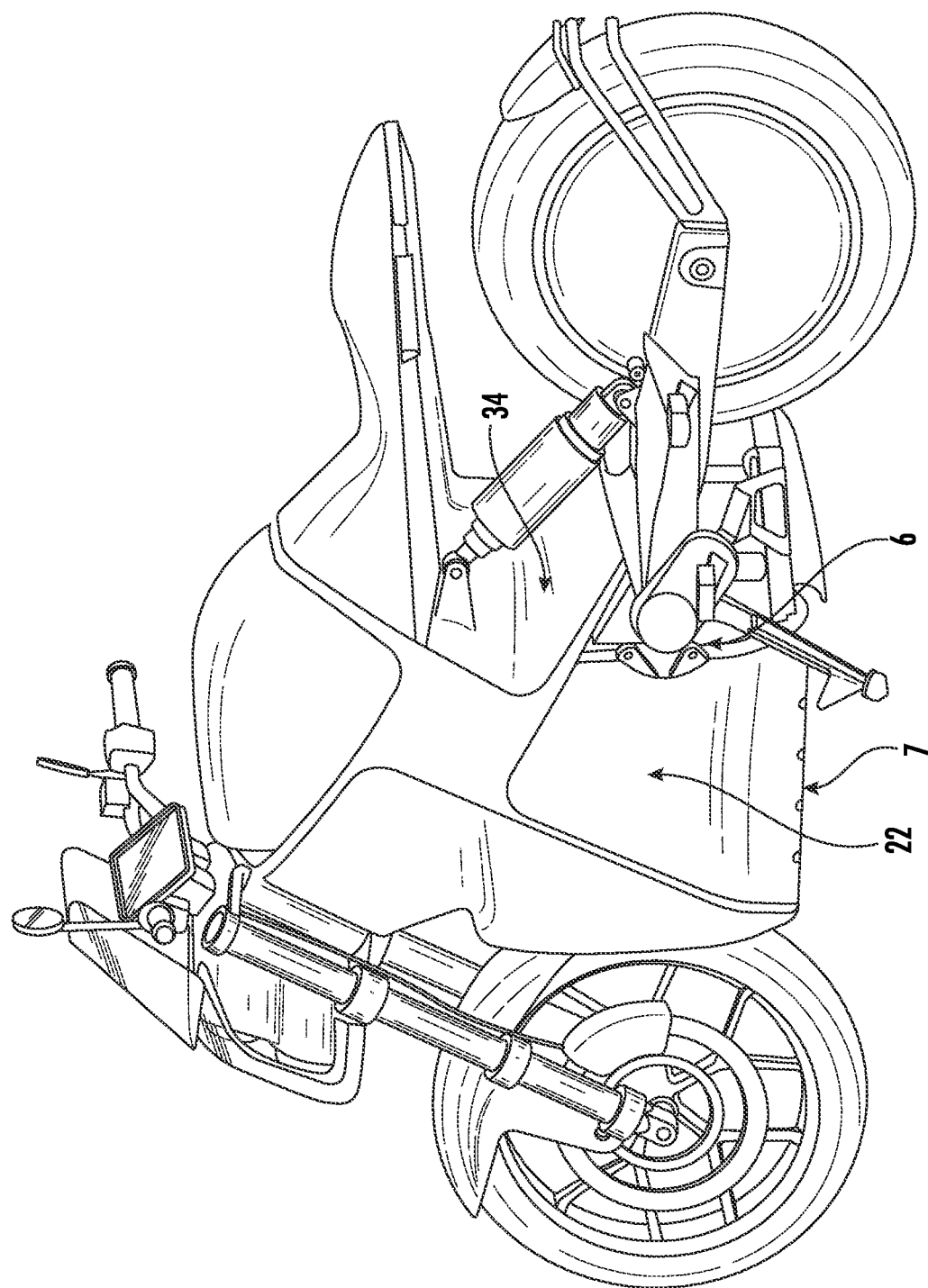
FIG. 6 illustrates a side perspective view of an alternate embodiment of the electric saddle type vehicle chassis of FIG. 1 according to aspects disclosed herein.
Figure 7:
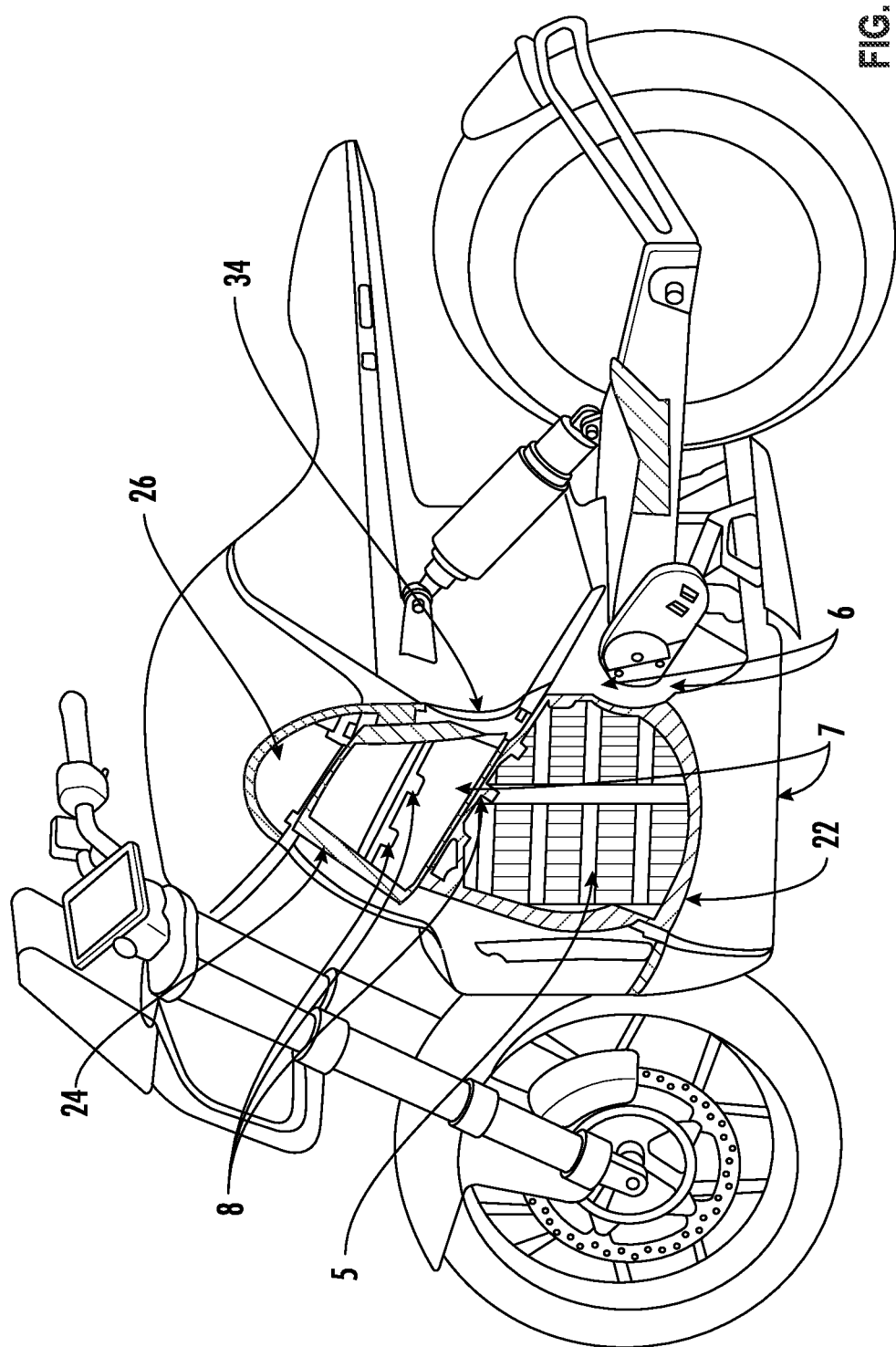
FIG. 7 illustrates a partial cross-sectional view of the electric saddle type vehicle chassis of FIG. 6 according to aspects disclosed herein.
Figure 8:
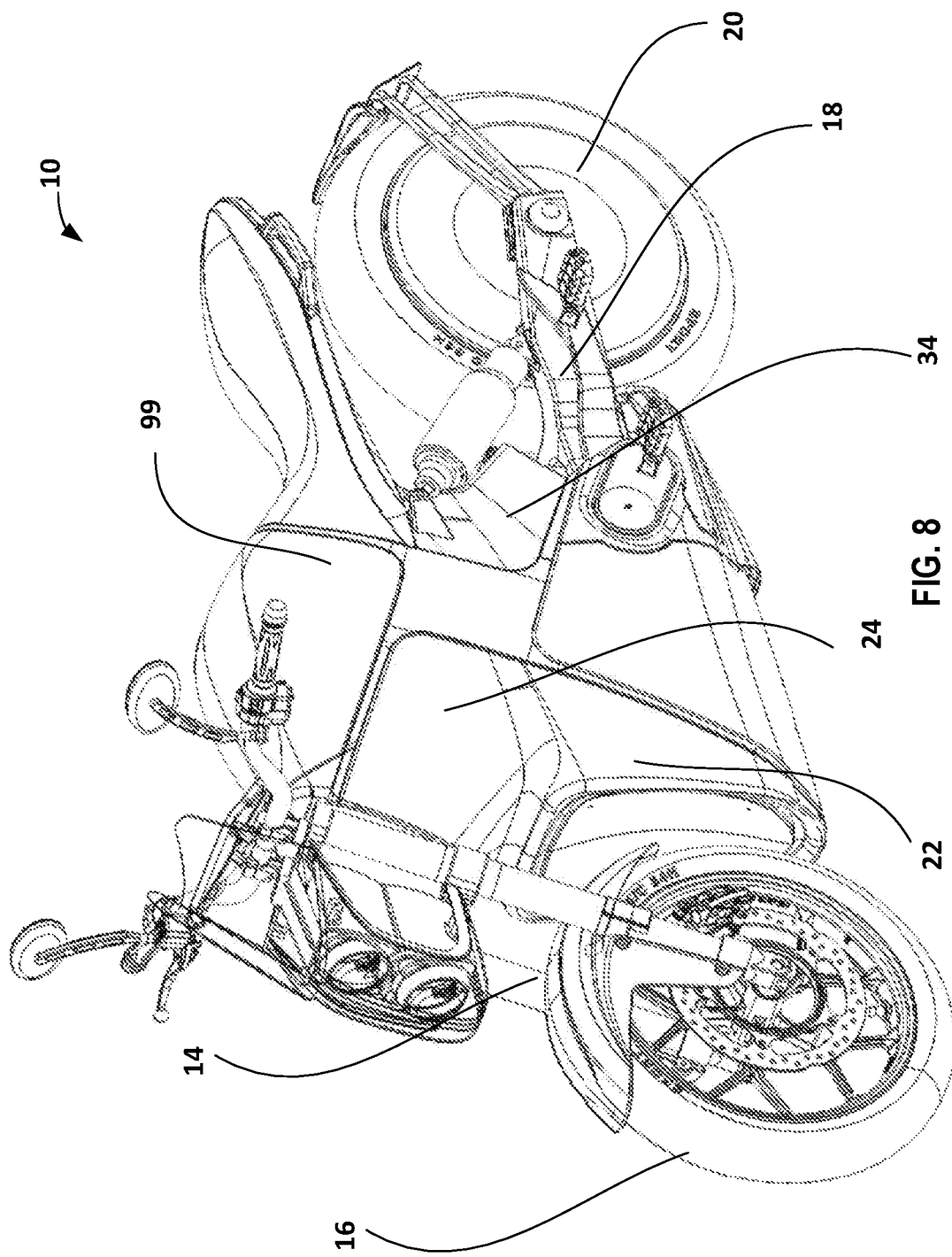
FIG. 8 illustrates a front perspective view of the electric saddle type vehicle chassis of FIG. 6 according to aspects disclosed herein.
Figure 9:
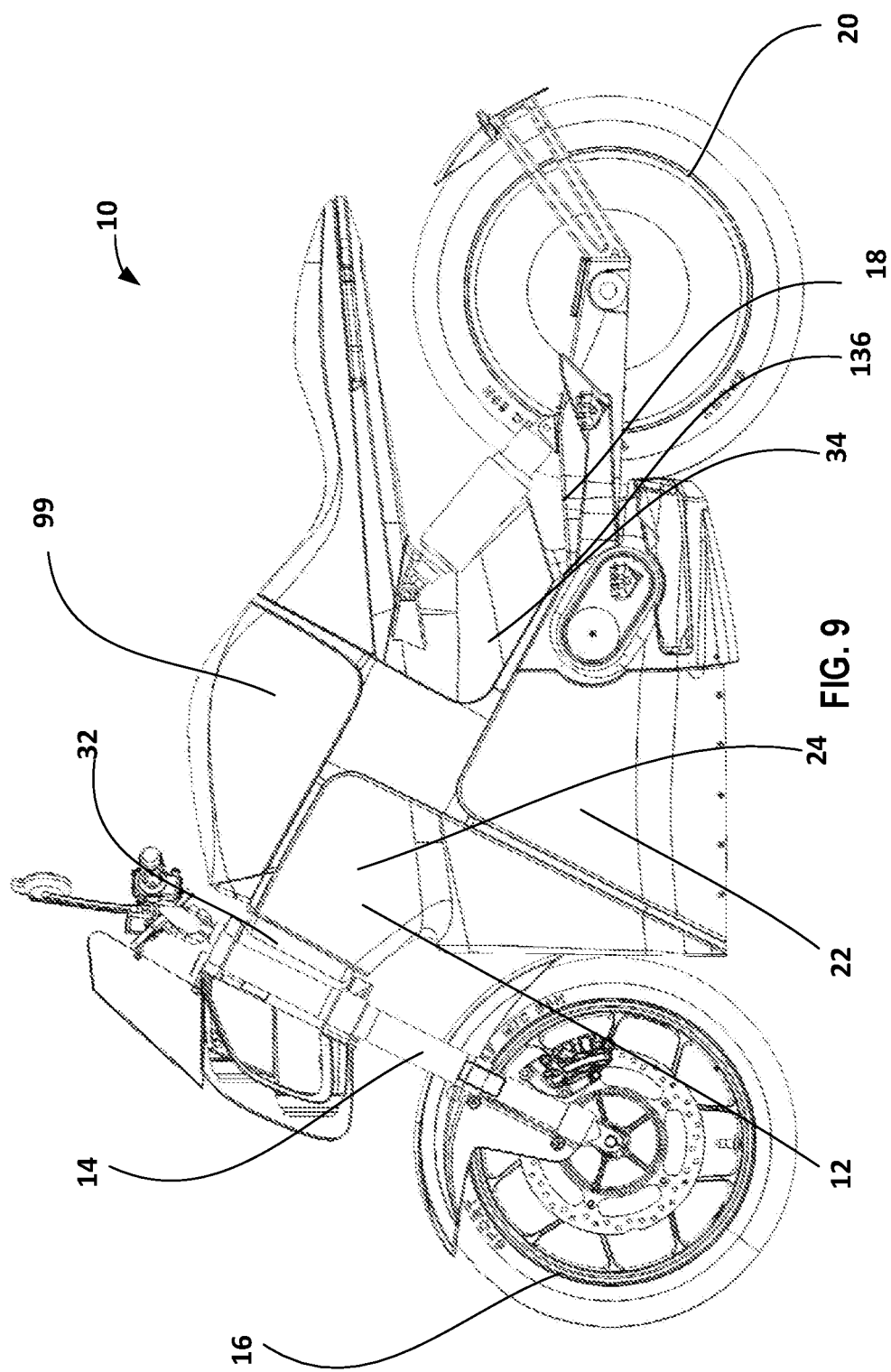
FIG. 9 illustrates a side view of the electric saddle type vehicle chassis of FIG. 6 according to aspects disclosed herein.
Figure 10:
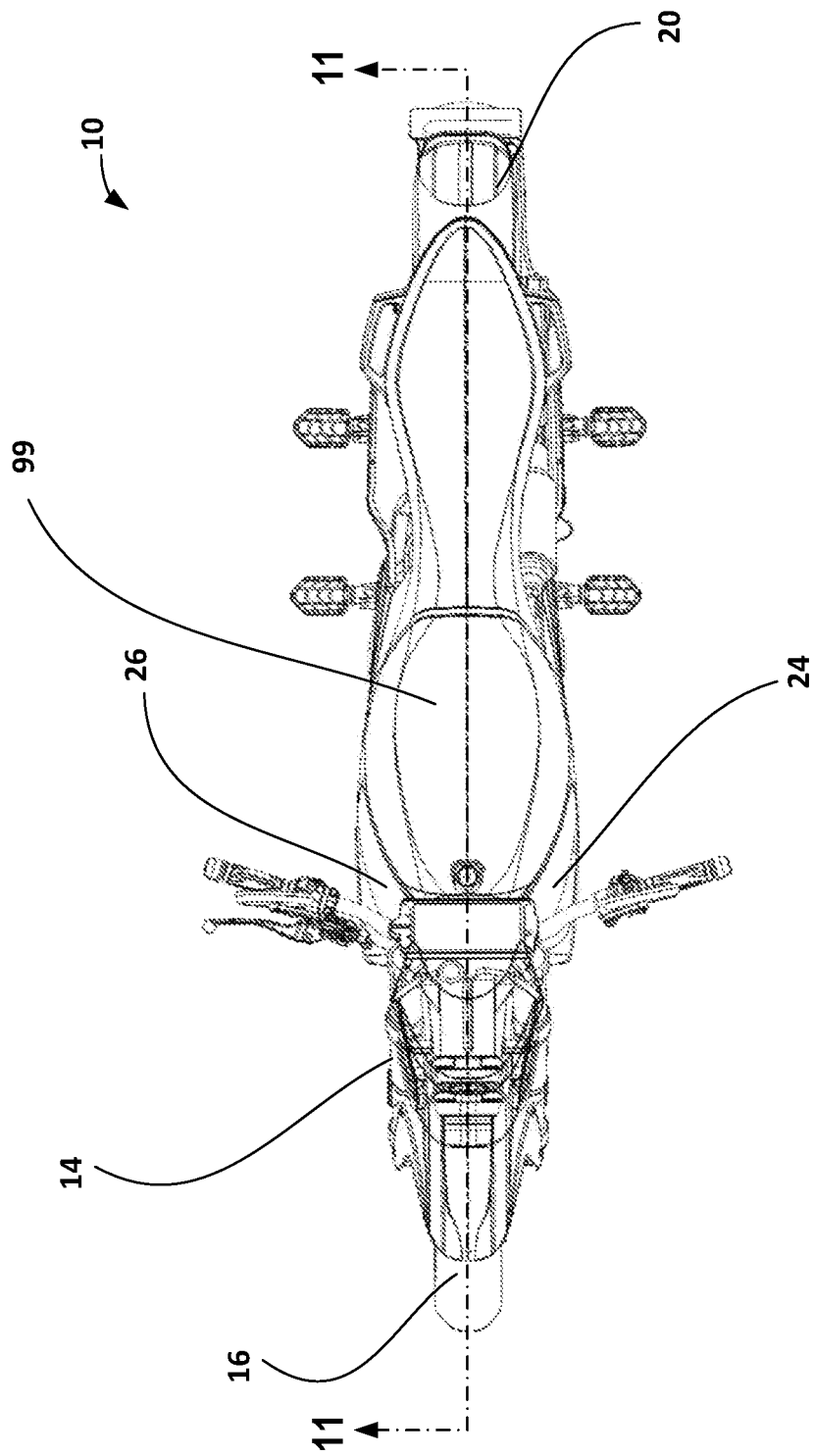
FIG. 10 illustrates a top view of the electric saddle type vehicle chassis of FIG. 6 according to aspects disclosed herein.

FIGS. 6-11 illustrate an embodiment of the motorcycle with chassis 12 described above. The structural members 24, 26, the battery housing 22, and the electronics housing 34 may be attached to each other with a plurality of mechanical connections. For example, the mechanical connections may be a plurality of mechanical fasteners, such as screws, or similar fasteners known to one skilled in the art. The fasteners may have a drive mechanism to ensure they are tamper proof to prevent any removal by an end user. FIG. 6 shows an external view of a motorcycle embodiment showing some of the attachment locations 6 where battery housing 22 is fixed to rear structure 34. In addition, as will be discussed in more detail below, a portion of the attachment locations 7 for the mechanical connections between the first side member 110 and the second side member 112 of the battery housing 22 may be along a longitudinal centerline of the motorcycle 10. FIG. 7 shows a partial cutaway view of the vehicle shown in FIG. 6. Battery cell pack 5 is visible as enclosed in battery housing 22. Internal attachment locations 7 between side members 110, 112 of battery housing 22 are seen, as well as a portion of attachment locations 8 of the mechanical connections that attach the battery housing 22 to the structural members 24, 26 to the top of battery housing 22.

The structural frame 12 may provide the required stiffness and strength to carry the structural loads efficiently from the steering mount structure 32 through the structural members 24, 26 and then through both battery housing 22 and electronics housing 34. In other words, the load path from tire to road forces may travel and be carried from the steering mount structure 32 through the structural members 24, 26 and then through both battery housing 22 and electronics housing 34, and the chassis structure may prevent deflection of the wheels relative to the center of gravity under lateral, longitudinal and vertical loads. For example, the structural frame 12 may have adequate stiffness and strength to prevent the frame from twisting under normal loading conditions such that the front wheel and rear wheel remain substantially coplanar when the vehicle receives up to a three g force in either a lateral, longitudinal, or vertical direction. With respect to this loading, substantially coplanar is defined as a range +/−5 degrees of being coplanar. As shown in the cross-sectional view of FIG. 11, the rear end of the steering mount structure 32 may be attached to the front end 129 of structural member 24 which may extend rearward and downward from the steering mount structure 32 to a rear end 130 attached to the front of the electronics housing 34. The swingarm 18, which supports the rear wheel 20, may connect to the rear end 136 of the electronics housing 34. The battery housing 22 may be located beneath the structural member 24 and in front of the electronics housing 34. The battery housing 22 may connect directly to a bottom surface the structural member 24 and the front surface of the electronics housing 34. The steering mount structure 32 may be integrally joined to the structural members 24, 26 such that separating the steering mount structure 32 from the structural members 24, 26 may damage the components. For example, the steering mount structure 32 may be welded, brazed, or adhesively joined to the structural members 24, 26.

Figure 11:
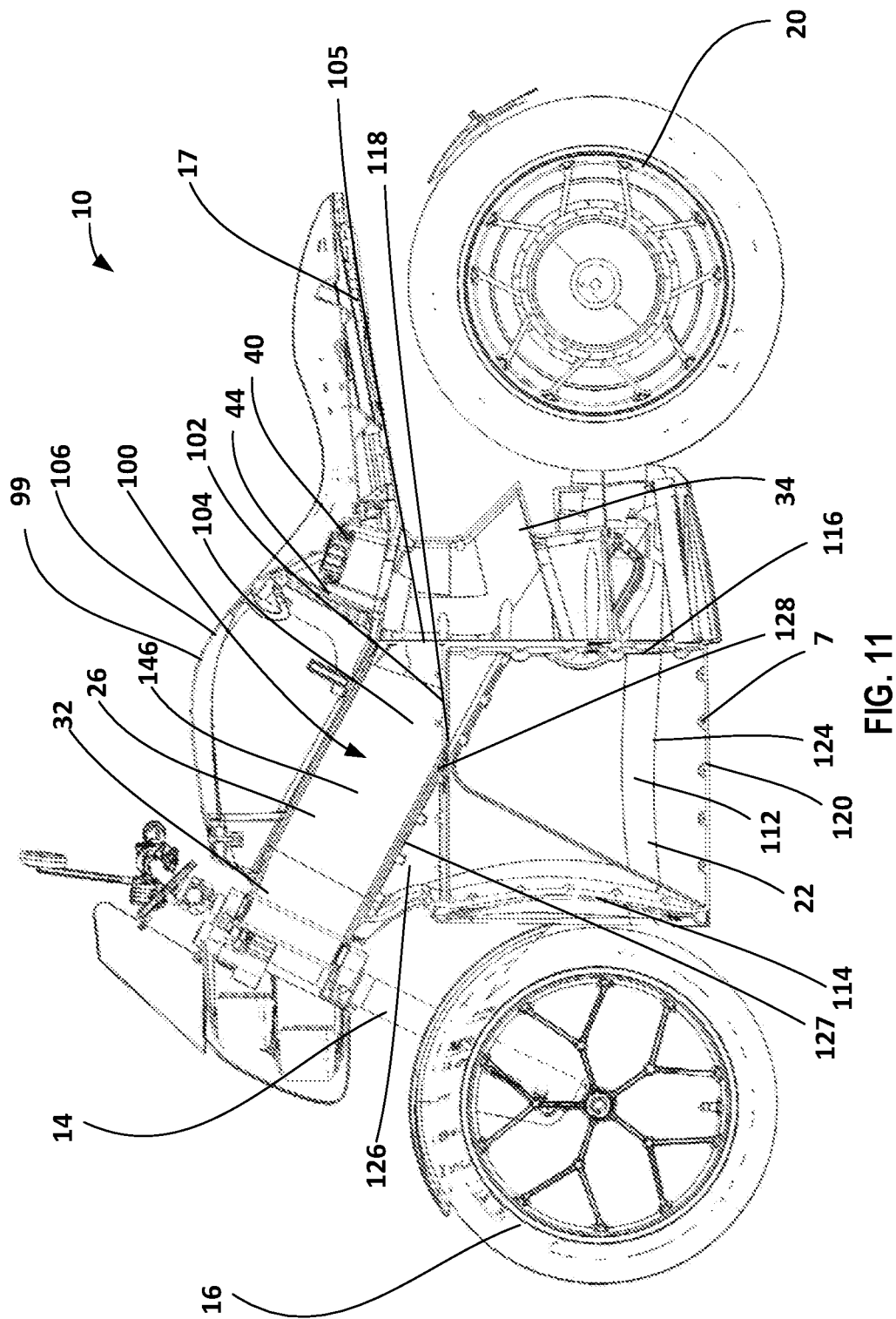
FIG. 11 illustrates a cross-sectional side view of the electric saddle type vehicle chassis of FIG. 10 according to aspects disclosed herein.

In addition, the storage compartment 100 may be seen in FIG. 11. The storage compartment 100 may have a bottom surface 102 formed by a top wall 118 of the battery housing 22, a first side surface 103 formed by inner surfaces 140 of the first structural member 24, a second side surface 104 formed by inner surfaces 146 of the second structural member 26, a rear surface 105 formed by a forward surface of the electronics housing, and a top surface 106 formed by the storage compartment cover 99. As another options, a portion of the first and second side surface 102 may be formed by inner surfaces 132 of the extensions 126.

The battery housing 22 may include a front wall 114, a rear wall 116 opposite the front wall 114, a top wall 118 extending rearward from the front wall 114, a bottom wall 120 extending rearward from the front wall 114 opposite the top wall 118, a first side wall 122 extending between the top wall 118 and the bottom wall 120, and a second side wall 124 extending between the top wall 118 and the bottom wall 120. The electronics housing 34 may be connected to the rear wall 116 of the battery housing 22. In addition, the battery housing 22 may have a pair of extensions 126 protruding vertically from the top wall 118, wherein a first extension 126A of the pair of extensions may engage and connect to the first structural member 24 and a second extension 126B of the pair of extensions 126 may engage and connect to the second structural member 26. The extensions 126 may have an angled top surface 127 and may extend from the top wall 118 at an intersection point 128 near a center of a rearward distance between the front wall 114 and the rear wall 116. Accordingly, the top surface 127 of the extension 126 may be spaced a greater distance away from the top wall 118 near the front of the battery housing 22 than at the intersection point 128. The extensions 126 may be arranged above the side walls 122, 124 such that the exposed outer side surfaces of the battery housing may be a smooth continuously contoured surface. The wall thickness of the extensions 126 may be similar or the same as the side wall thickness to provide an open space between the extensions 126 to help form the storage compartment 100 when attached to the structural members 24, 26. The top wall 118 and the top surfaces 127 of the pair of extensions 126 may directly connect to the structural members 24, 26.

Figure 12:
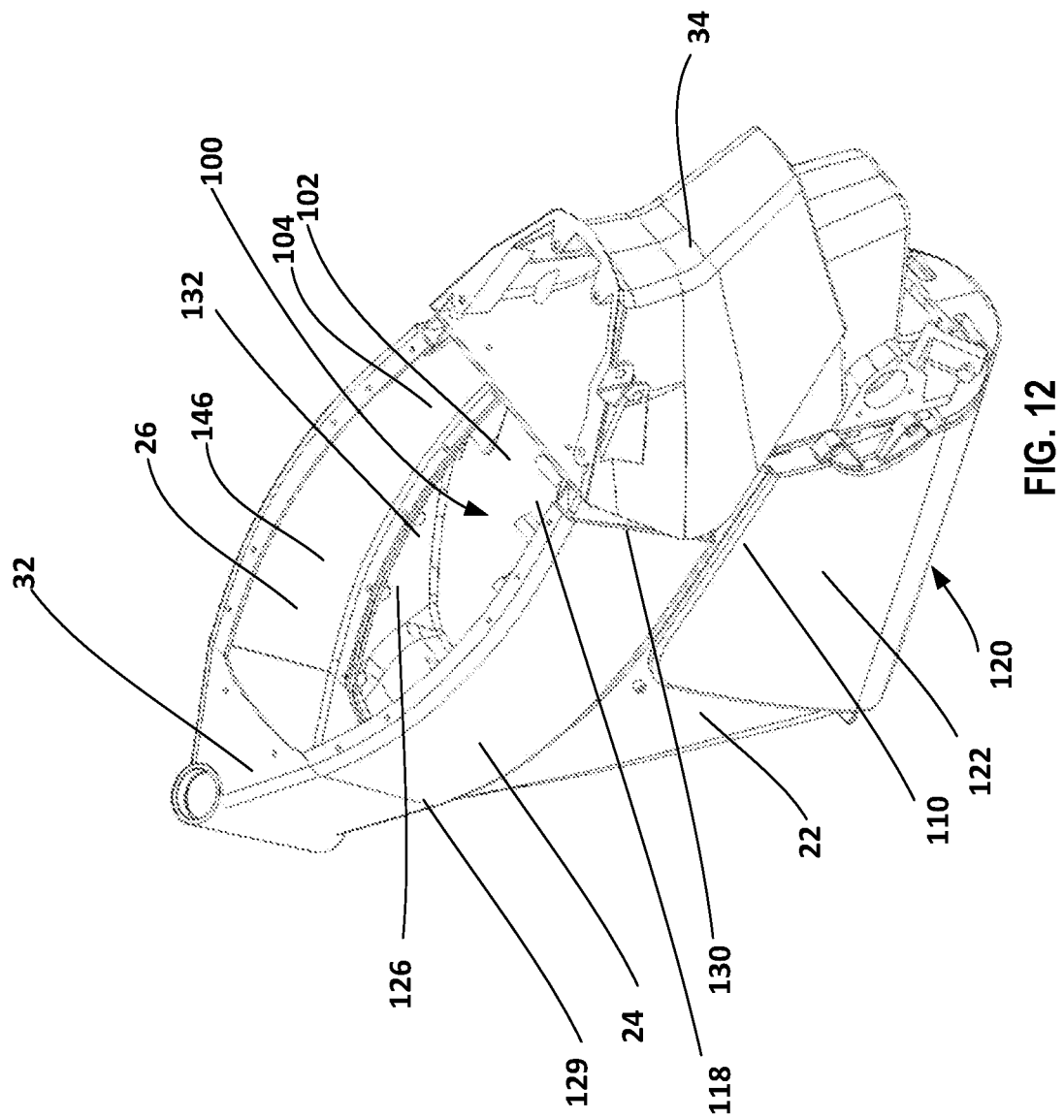
FIG. 12 illustrates an rear perspective view of the electric saddle type vehicle chassis of FIG. 6 with multiple part removed for clarity according to aspects disclosed herein.
Figure 14:
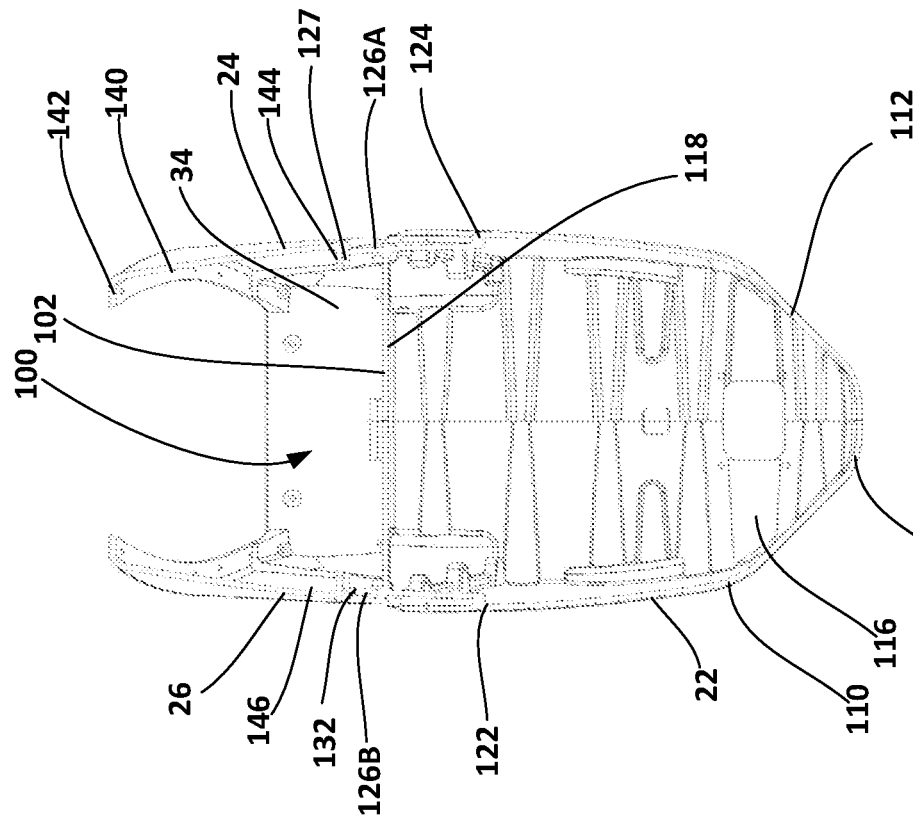
FIG. 14 illustrates a cross-sectional front view of the electric saddle type vehicle chassis components of FIG. 13 according to aspects disclosed herein.
Figure 13:
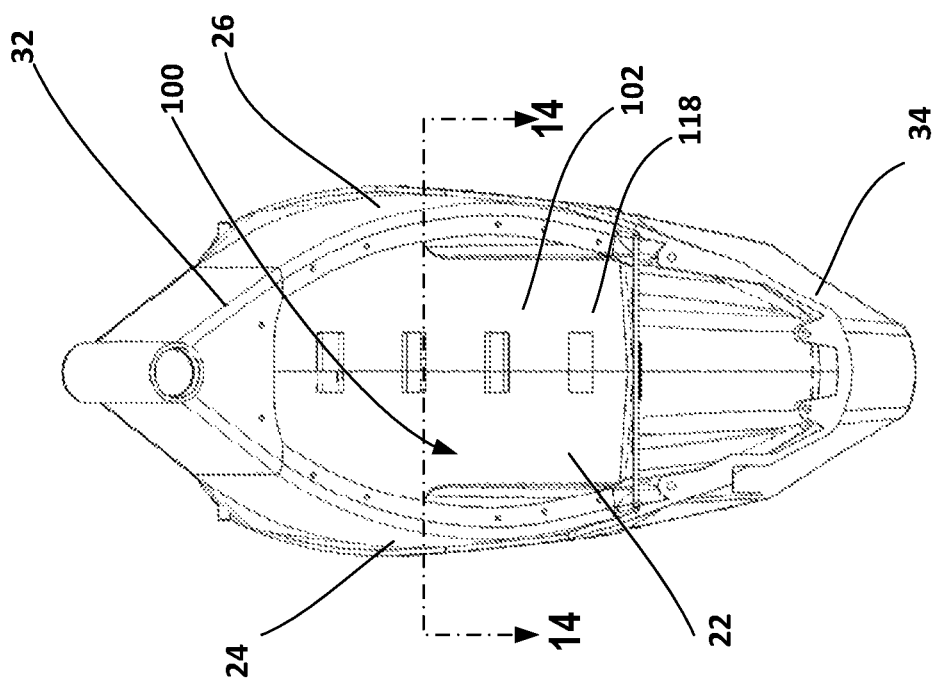
FIG. 13 illustrates a top view of the electric saddle type vehicle chassis components of FIG. 12 according to aspects disclosed herein.
Figure 15:
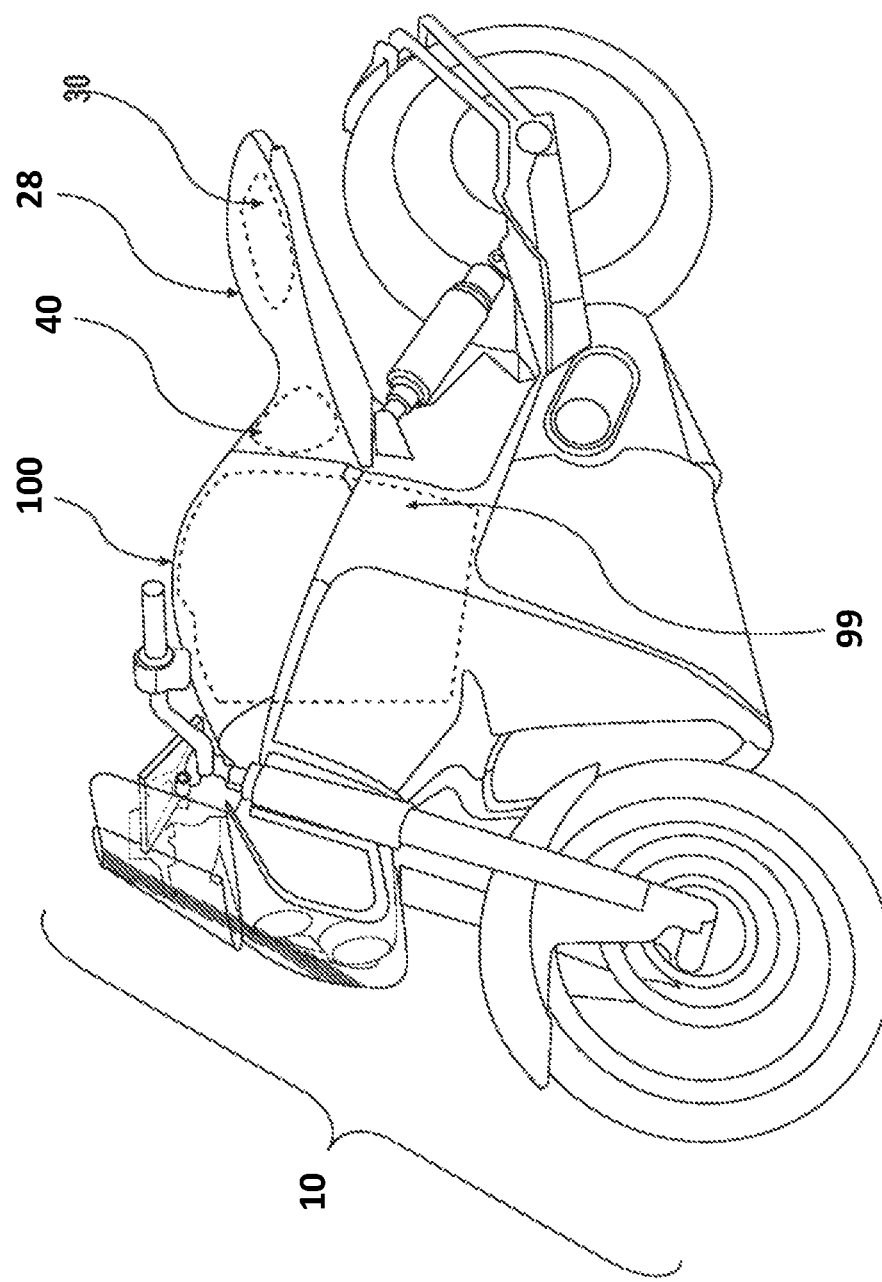
FIG. 15 illustrates a side perspective view of another example of a saddle type vehicle according to aspects disclosed herein.

FIGS. 12-14 illustrate the structure of the steering mount structure 32, the structural members 24, 26, the electronics housing 34, and the battery housing 22 in more detail. FIGS. 12-14 have all of the components removed except steering mount structure 32, the structural members 24, 26, the electronics housing 34, and the battery housing 22 to better illustrate this portion of the chassis 12. FIG. 12 shows the inside of the storage compartment 100 without the cover 99. In addition, FIG. 14 illustrates a cross-sectional view through the storage compartment 100 and battery housing 22. The inner side surfaces 103, 104 of the storage compartment 100 may be formed by extensions 126 and the inner surfaces 140, 146 of structural members 24, 26. Further, the structural members 24, 26 may have a substantially C-shaped cross-section that includes an upper flange 142 and lower flange 144. The lower flange 144 may provide a mounting surface to the top surface 127 of the extensions 126. In addition, the bottom surface 102 of the storage compartment may be formed by an upper surface of the top wall 118.

The battery housing 22 may be formed from first side member 110 and second side member 112 and may be connected to each other along a longitudinal centerline of the motorcycle 10. Each side member 110, 112 may be formed as a unitary piece and may be formed from a metallic material using a casting, machining, forging, metal injection molding or other process known to own skilled in the art. In addition, the electronics housing 34 may be formed a unitary piece to may be formed from a metallic material using a casting, machining, forging, metal injection molding or other process known to own skilled in the art. Each of the structural members 24, 26 of the chassis 12 may also be formed as a unitary piece and formed from a metallic material using a casting, machining, forging, metal injection molding, extrusion, or other process known to own skilled in the art. While not limiting, metallic materials may be aluminum or aluminum alloy, magnesium or magnesium based alloy, a steel alloy, or other metallic material known to one skilled in the art. In some embodiments, the side members 110, 112 may be formed from a nonmetallic material such as carbon composite structure, or fiber-filled polymeric material. Alternatively, in some embodiments, the structural members 24, 26, electronics housing 34, and side members 110, 112 of the battery housing 22 may be formed from multiple components. In some embodiments, the battery housing 22 may include an environmental seal between the side members 110, 112 to help keep dust and moisture from entering the battery compartment. The seal may be formed from an elastomeric material.

Figure 20:
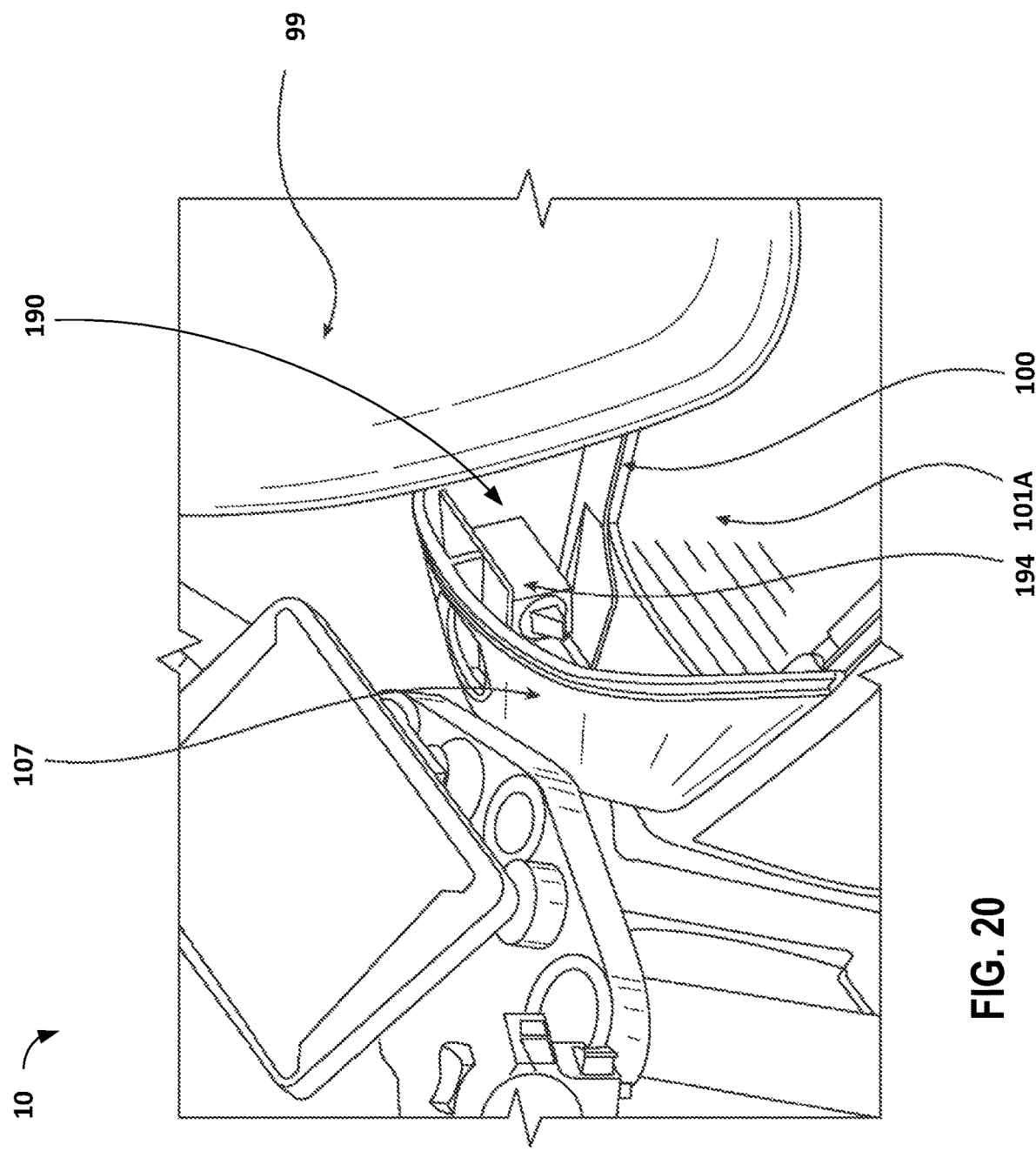
FIG. 20 illustrates a partial side perspective view of the saddle type vehicle of FIG. 15 with the storage cover open according to aspects disclosed herein.
Figure 21:
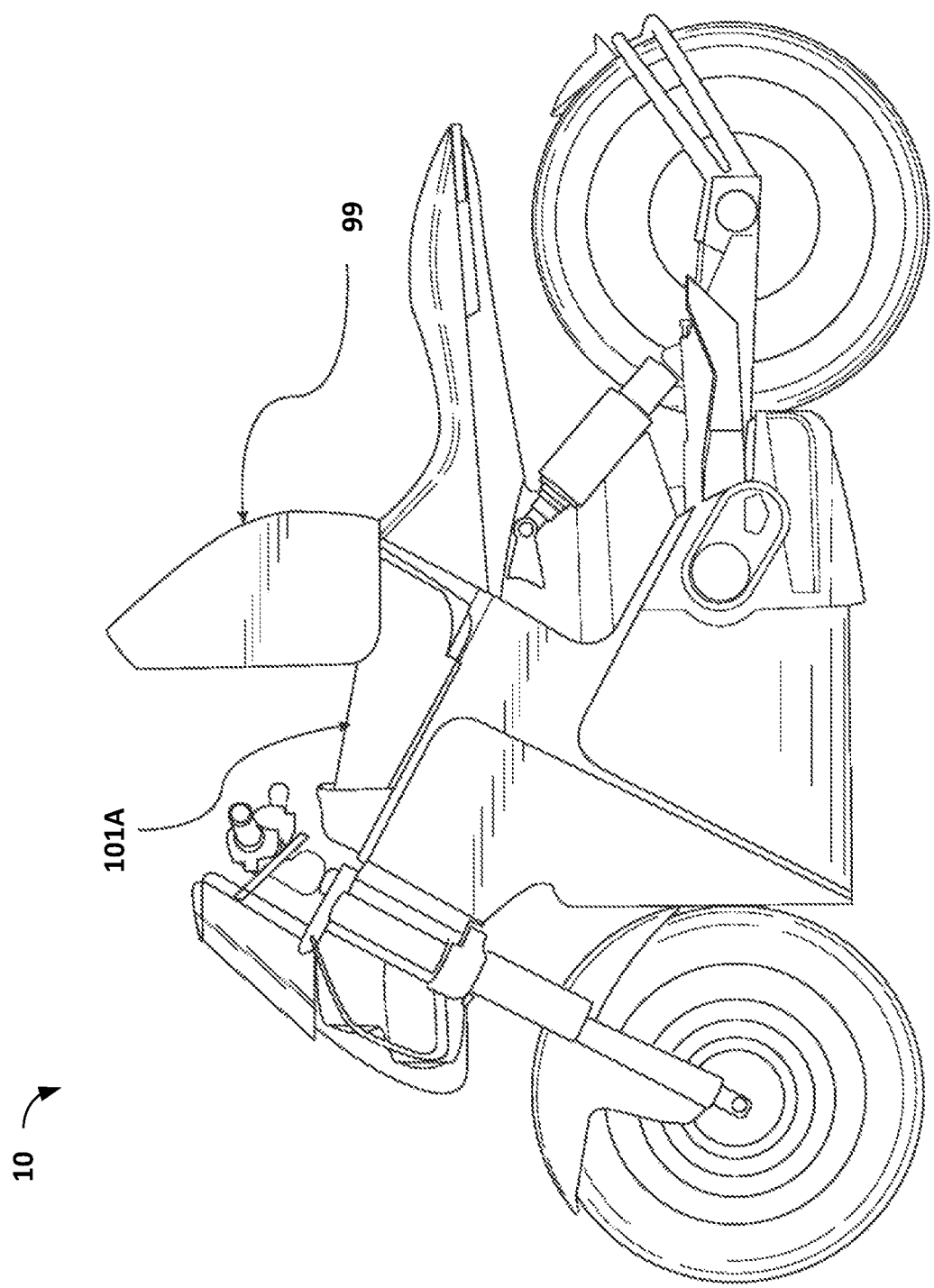
FIG. 21 illustrates a side view of the saddle type vehicle of FIG. 15 with the storage cover open according to aspects disclosed herein.
Figure 22:
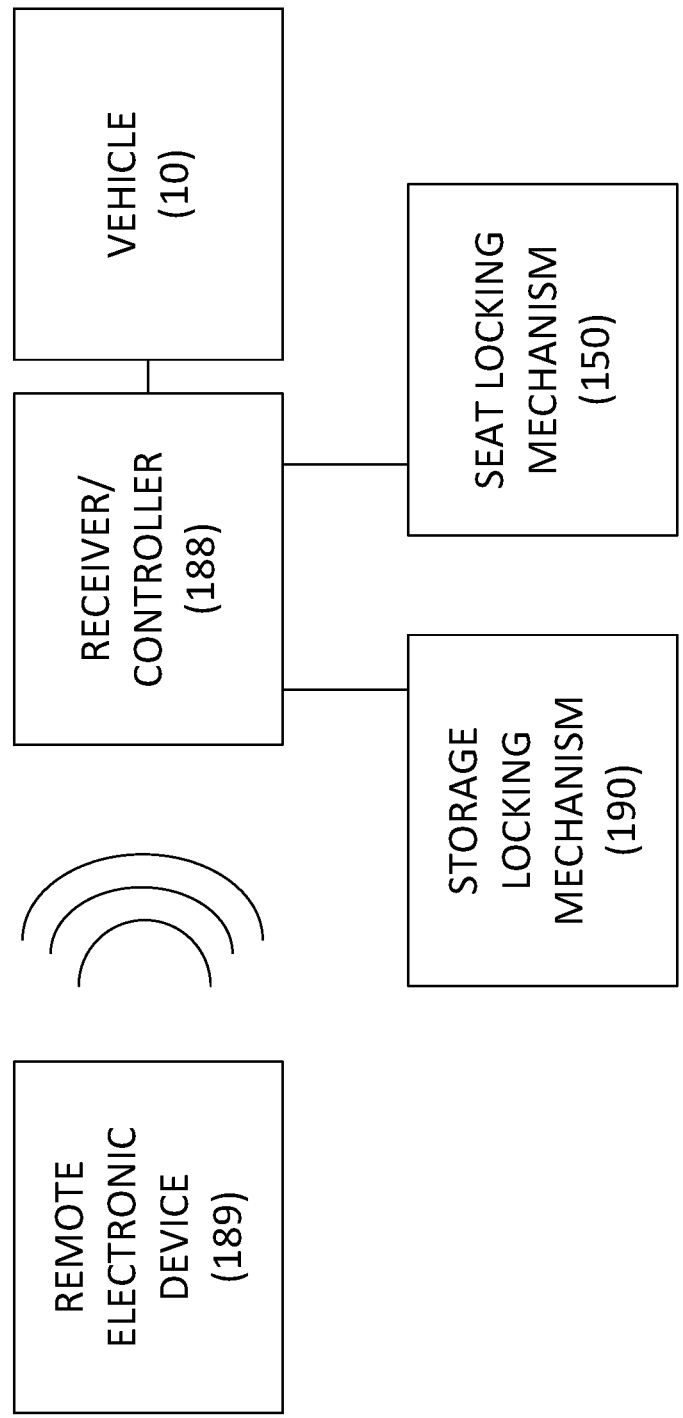
FIG. 22 illustrates a schematic of the remote control of the locking mechanisms according to aspects disclosed herein.

FIGS. 15-22 illustrate another example saddle type vehicle 10 similar to the saddle type vehicle 10 described above described in FIGS. 1-14. The example vehicle 10 shown in FIGS. 15-22 may incorporate electronic locking mechanisms to secure the onboard storage and access to the charging port where the locking mechanisms may be controlled by a remote electronic device. FIGS. 15-22 further illustrate a saddle type vehicle with an electronic locking mechanism 190 that secures the storage compartment cover 99 as well an electronic locking mechanism 150 for securing the seat 28. The saddle type vehicle 10 may include onboard storage in multiple locations and a high voltage charge port 40, where a user may activate electronic locks through a remote electronic device 189 such as a phone, computer, fob, or other electronic device known to one skilled in the art as shown in FIG. 22.

FIGS. 15-18 illustrate a saddle type vehicle 10 similar to the saddle type vehicle described above with respect to the examples in FIGS. 1-14. Motorcycle, or saddle type vehicle, 10 in FIGS. 15-22 may have a similar chassis 12 along with a primary storage compartment 100 located under storage cover 99 that is located in front of the rider. The high voltage charging port 40 may be located underneath seat 28, and a secondary storage area 30 may also located under seat 28. The vehicle 10 may try to maximize its storage capability through the use of under seat and other storage areas, and also quick charge ports 40 take advantage of the availability of urban high voltage charging stations.

The saddle type vehicle 10 as shown and described below incorporates onboard storage 30, 100 and a high voltage charge port 40, where access to these features may be controlled through phone or fob activated electronic locks. The illustrated example may include staged access to the quick charge port 40 under the front of the seat 28 via the release of a solenoid type latch 162 where an actuator 166 may push the seat 28 rearward on rails until the port 40 is exposed. The staged access continues to expose under seat storage 30, wherein a second solenoid type latch 172 may release the seat 28 to swivel upwards on a hinge, where the seat 28 is raised by a second actuator 182. This allows access to the storage area 30 under the seat 28. Through this arrangement, the vehicle 10 may have the charge port 40 exposed for connection at a charging station, while under seat storage 30 remains locked and inaccessible. Alternatively, both the charging port 40 and under seat storage 30 may be accessible using a single stage locking mechanism.

The seat locking mechanism 150 may control access to the charging port 40 as well as access to the secondary storage area 30. The seat locking mechanism 150 may have a locked configuration and an unlocked configuration. When the locking mechanism 150 is in the locked configuration, a user cannot access the charging port 40 or the secondary storage 30. The locking mechanism 150 may have an unlocked configuration that provides staged access first to quick charging port 40 when in the first unlocked stage and when in the second (or fully) unlocked stage allows access to both the quick charge electrical port 40 and the secondary storage compartment 30 located underneath the seat 28. In addition, the seat locking mechanism 150 may include a first locking assembly 160 to control the first unlocking stage and a second locking assembly 170 to control the second unlocking stage. Through this arrangement the vehicle 10 may have the charge port 40 exposed for connection at a charging station, while under seat secondary storage 30 remains locked and inaccessible. Alternatively, both the charging port 40 and under seat storage 30 may be accessed when the seat locking mechanism 150 is fully unlocked.

Figure 16:
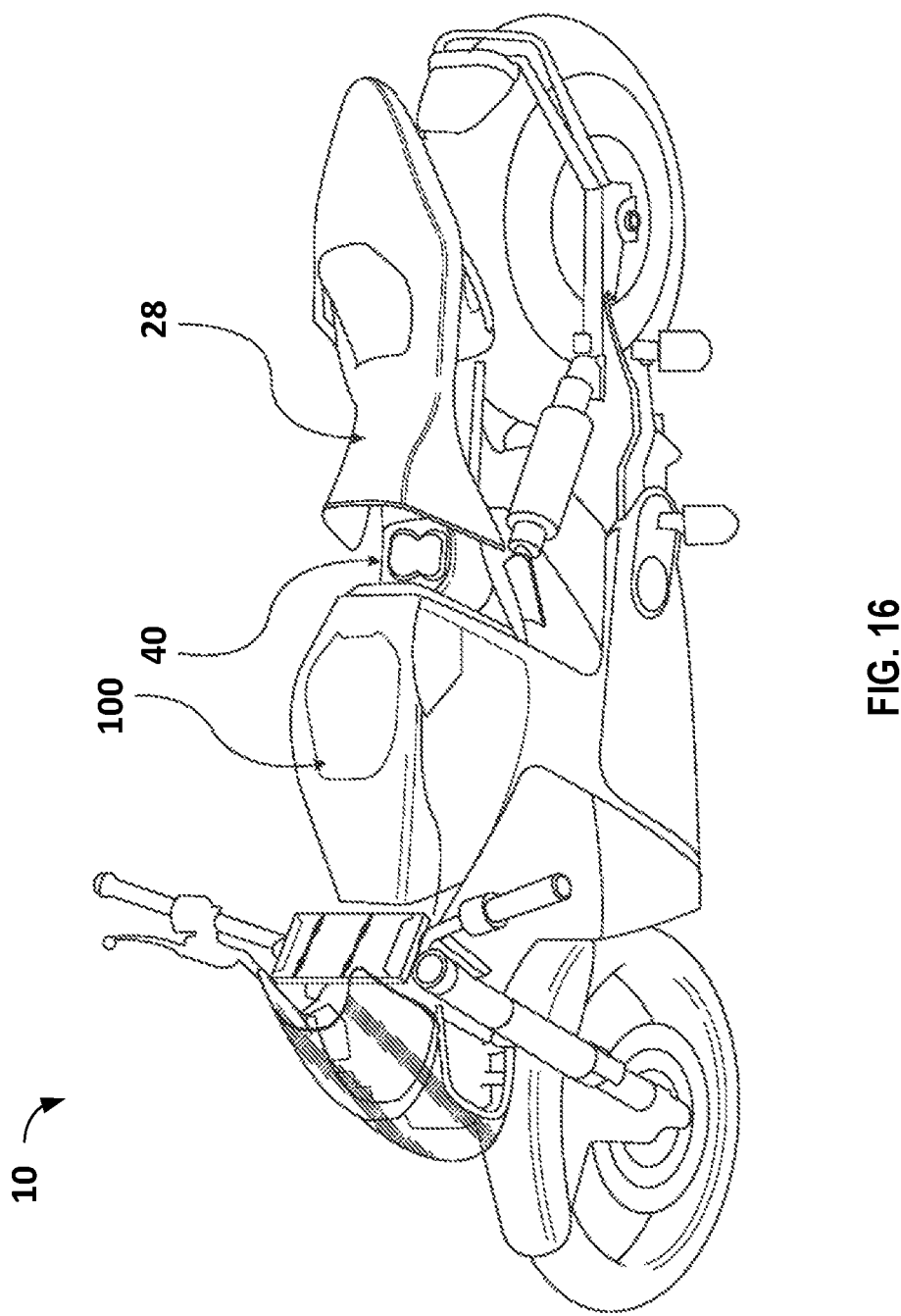
FIG. 16 illustrates a side perspective view of the saddle type vehicle of FIG. 15 with the seat shifted rearward according to aspects disclosed herein.
Figure 17:
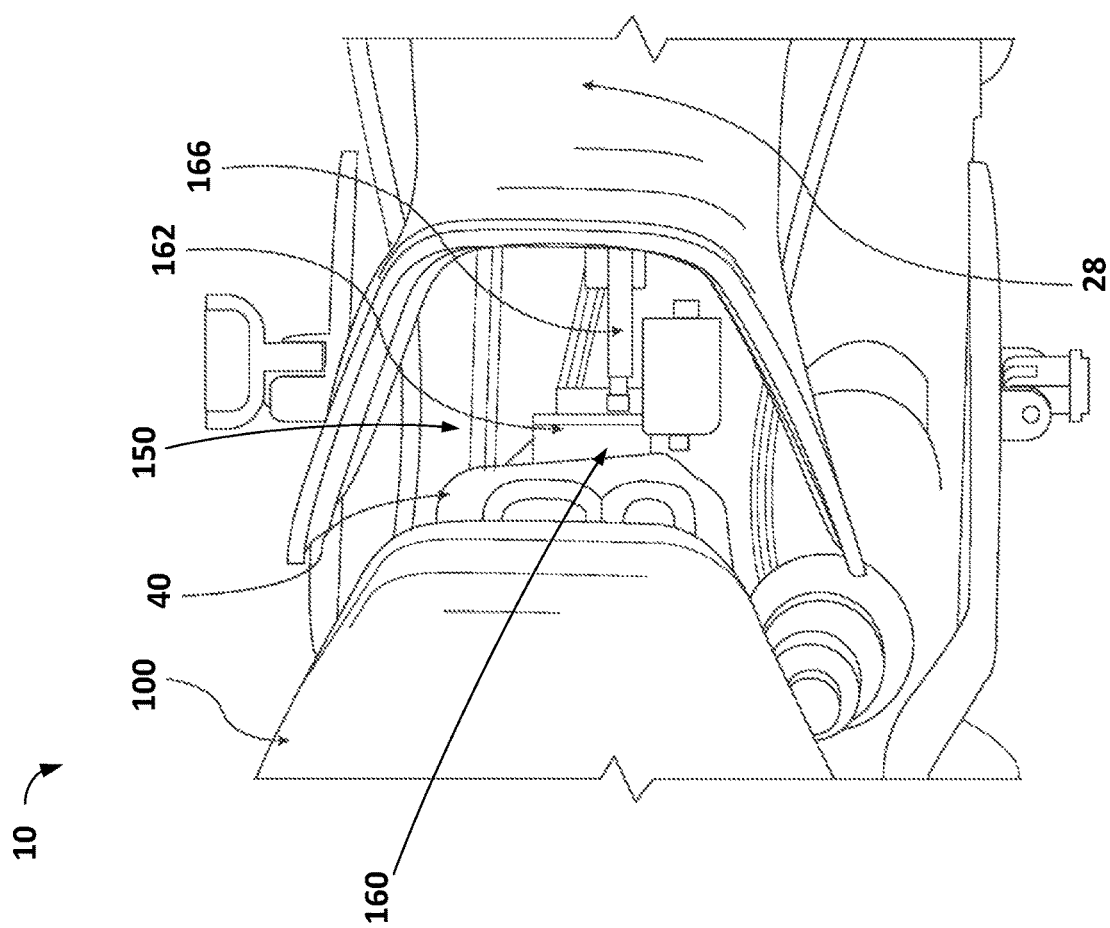
FIG. 17 illustrates a partial top perspective view of the saddle type vehicle of FIG. 15 with the seat shifted rearward according to aspects disclosed herein.
Figure 18:
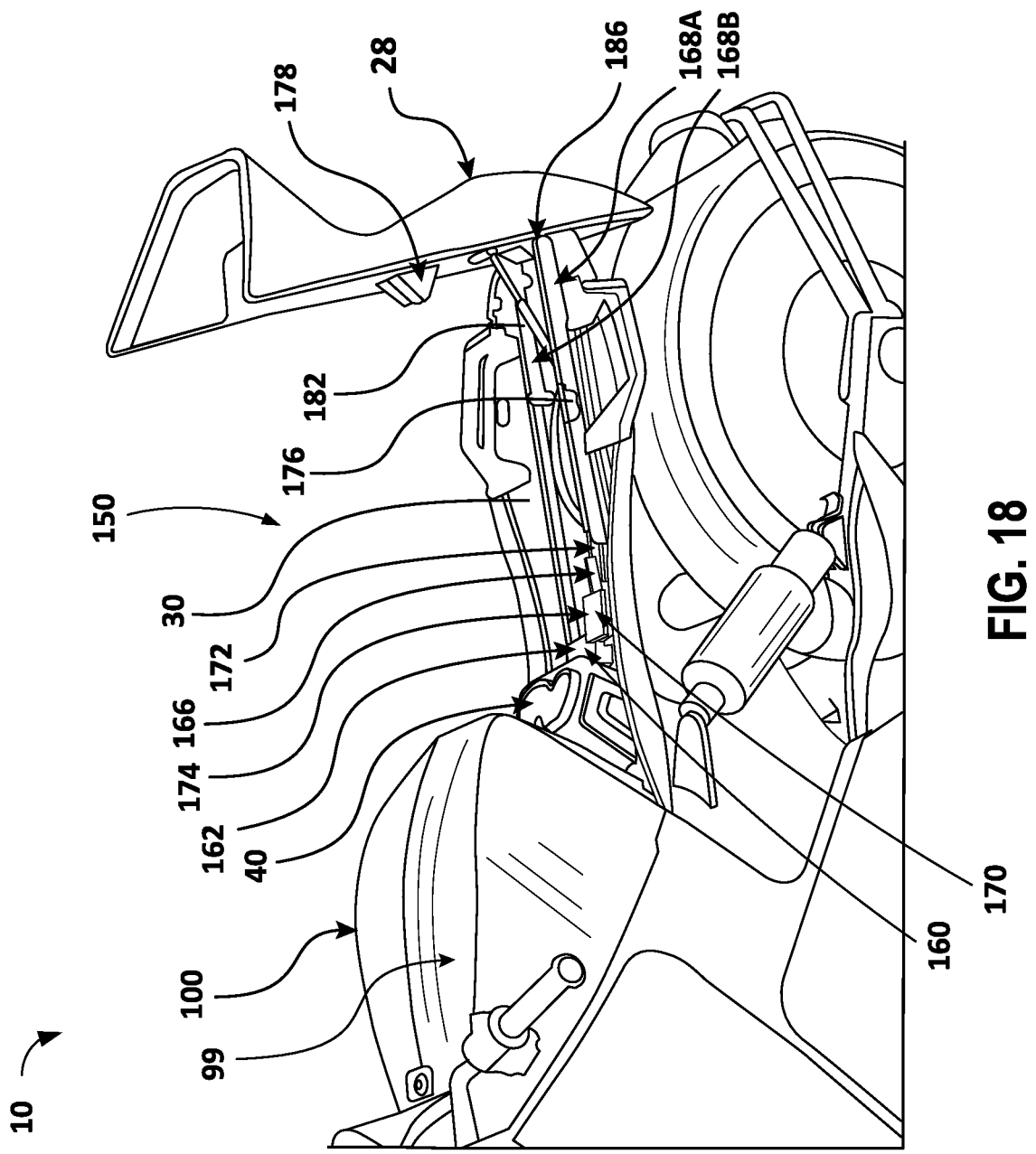
FIG. 18 illustrates a partial side perspective view of the saddle type vehicle of FIG. 15 with the seat rotated upwards according to aspects disclosed herein.

The first seat locking assembly 160 may control access to the charging port 40 such that when the first seat locking assembly is unlocked, the seat 28 may be allowed to slide a predetermined distance rearward to provide access to the quick charge electrical port 40. The first seat locking assembly 160 may include a first seat latch solenoid 162, a first seat latch, and a first seat actuator 166. The first seat latch may releasably engage the seat 28, and the first seat latch solenoid 162 may control movement of the first seat latch. When a command is received by a receiver/controller 188 to move the first seat locking assembly 160 from the locked configuration to the first unlocked stage of the unlocked configuration, the first seat latch is released from the first seat latch solenoid 162. Upon releasing seat latch, the first seat actuator 166 pushes the seat 28 rearward along a plurality of rails 168 to expose the quick charge electric port 40 as shown in FIGS. 16 and 17. The seat 28 may move rearward a predetermined distance. This predetermined distance may be determined by a length of the rails 168A, 168B such that the seat 28 may be slidably engaged with the rails 168A, 168B where the seat 28 has a pair of axles with wheels at each end that move along the rails 168A, 168B. The wheels may stop when the wheels on the rear axle 36 reach the end of the rails 168A, 168B to control the predetermined distance that exposes the charging port 40. The first seat latch may be located in the forward region under seat 28.

The second seat locking assembly 170 may control access to both the charging port 40 as well as the secondary storage compartment 30. The seat 28 may slide and rotate to a second position of seat opening is illustrated, and the mechanisms for both the first rearward movement of the seat 28 to expose charge port 40, and for a secondary rotation movement of seat 28 to expose secondary storage area 30. To allow rotational movement of seat 28 such that storage area 30 is exposed, solenoid 174 is triggered which pulls rod 172, opening a latching door 176, which releases front seat axle 178 as seat 28 is pushed upward by actuator 182 around the axis of rear axle 186. When the second seat locking assembly 170 is moved to the second unlocked stage, the seat 28 may slide a distance greater than the predetermined distance and then rotate upward around a rear pivot axis to allow access to the secondary storage compartment 30 as well as the charging port 40. The second seat lock assembly 170 may include a second seat latch 172, a second seat latch solenoid 174, a latching door 176 releasably engaged to the second seat latch, or rod, 172, where the latching door 176 may releasably engage a front seat axle 178 located on a bottom surface of the seat 28. Additionally, a second seat actuator 182 may be connected to the seat 28. When the second seat lock assembly 170 is moved from the locked configuration to the second unlocked stage of the unlocked configuration, the second seat latch solenoid 174 may pull the seat second latch 172, which in turn opens the latching door 176 to release the front seat axle 178 on the bottom of the seat 28. Upon release of the front seat axle 178, the second seat actuator 182 exerts a force on the seat causing the seat 28 to rotate upwards around a pivot axis of the rear axle 186 located near a rear end of the seat 28.

Figure 19:
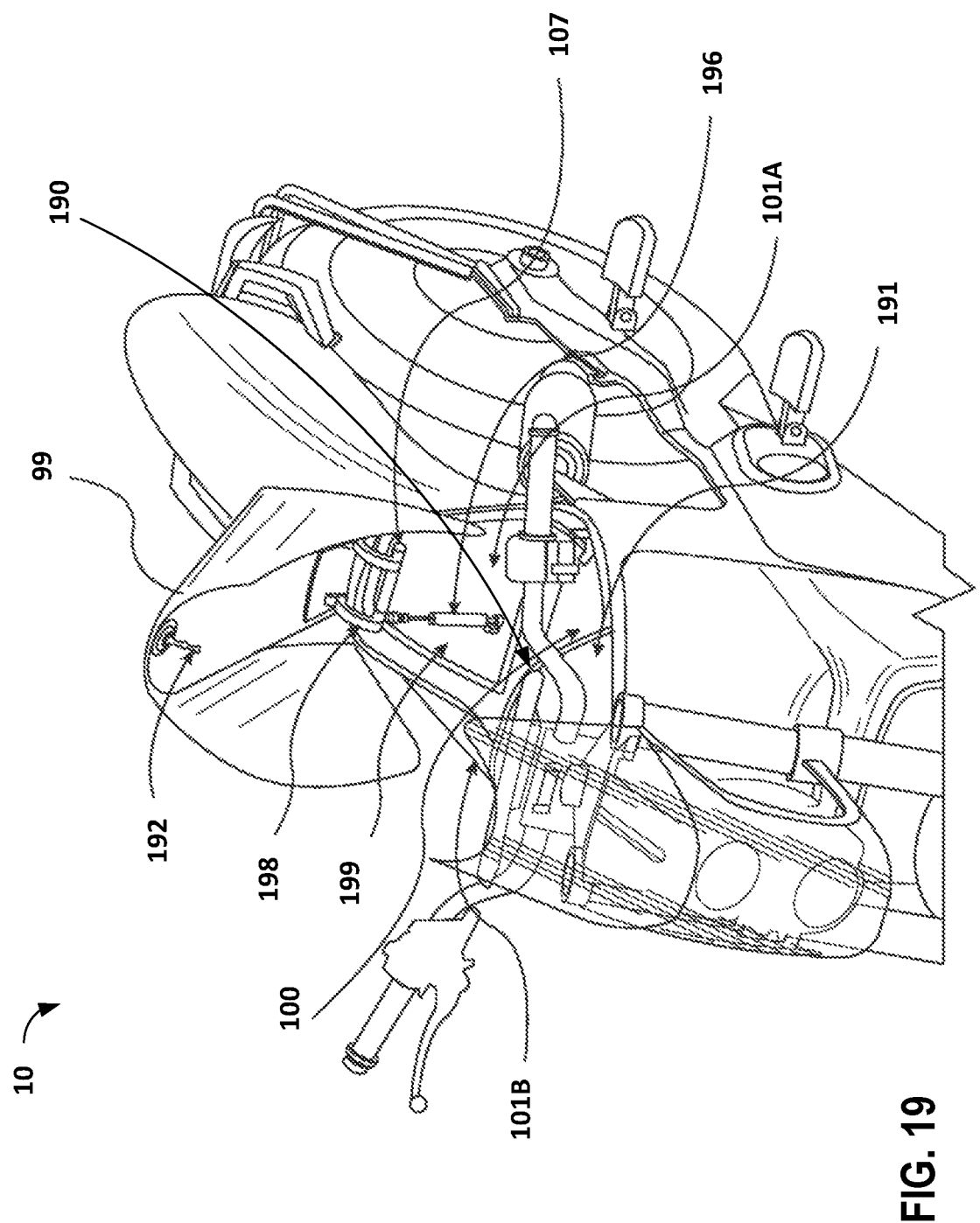
FIG. 19 illustrates a partial front perspective view of the saddle type vehicle of FIG. 15 with the storage cover open according to aspects disclosed herein.

As shown in FIGS. 19-21, a primary storage compartment 100 may be located forward of seat 28 and also located above a battery housing 22. The storage compartment 100 may be accessed via by rotating the storage compartment cover 99 around a cover hinge axis 107. A storage locking mechanism 190 may control the movement of the cover 99 such that the storage locking mechanism 190 may have an unlocked configuration to allow access to the primary storage compartment 100, and a locked configuration to secure the primary storage compartment 100. The storage locking mechanism 190 may include a storage latch pin 192, a storage latch solenoid 194, a storage actuator 196, a cover hinge 197, and a mounting plate 199. The storage latch solenoid 194 may be mounted in the latch mount housing 191. When the storage locking mechanism is moved from the locked configuration to the unlocked configuration, the storage latch solenoid 194 may release the storage latch pin 192. Upon release of the latch pin 192, the storage actuator 196 may exert a force on a hinge plate 198 of the cover hinge 197 to rotate the cover 99 about the cover hinge axis defined by the fixed pivot on the mounting plate 199. The storage actuator 196 may mount at its lower end on vertical mounting plate 199 and push on the hinge plate 198 that is fixed to the storage cover 100.

The storage compartment 100 may further include a flexible fabric liners or mesh retainers 101A, 101B arranged on both sides to prevent items stored inside storage compartment 100 from falling out the sides.

The locking mechanisms 150, 190 may be activated using a remote electronic device 189 such that the locking mechanisms 150,190 may be moved from the locked configuration to the unlocked configuration using the remote electronic device 189. The saddle type vehicle 10 may have a receiver/controller that can communicate wirelessly with the remote electronic device 189. In some examples, the locking mechanisms 150, 190 may have their own receiver/controller to communicate wirelessly with the remote electronic device. The remote electronic device 189 may have separate buttons or button sequences on to lock or unlock each mechanism 150, 190 to enable or prevent access to each storage compartment 30, 100. As other options, the remote electronic device may include separate screen buttons, voice commands, or other user interface to allow a user to lock and unlock the locking mechanisms 150, 190. The remote electronic device may connect via Bluetooth or similar unique wavelength connectivity, and also serve to control enabling operation of the electric motor and locking of the vehicle either by a steering lock or other chassis lock such as a rear wheel rotation latch which is solenoid activated via the fob or phone.

In some examples, separate buttons or button sequences on a fob access each locked space, or separate screen buttons or voice commands do the same from a mobile phone. The remote electronic device 189 may be wirelessly connected to the receiver 188 of the vehicle 10 via Bluetooth or similar unique wavelength connectivity. The receiver/controller 188 may be connected locking mechanisms 150, 190, the motor controller 45, as wells as other electronic components of the vehicle 10. The remote device 189 may also serve to control and enable operation of the electric motor and locking of the vehicle either by a steering lock or other chassis lock such as a rear wheel rotation latch which may also be solenoid activated via the fob or phone. Both of either the fob or mobile phone and the mechanisms on the motorcycle 10 are built to handle Bluetooth or similar unique wavelength signals. The fob or phone send command signals for mechanism operations. The mechanisms on the motorcycle 10 may have signal receivers and respond to the commands from the fob or mobile phone with responsive motions of solenoids, to both open and close access to the charging port and storage areas. The motorcycle may also generate command signals for operation independent of reliance on a fob or phone, and these signals may be transmitted wirelessly or by wire.

The solenoids 162, 174, 194 may be electromagnetic devices that are capable of securing and releasing a latch. Additionally, the actuators 166, 182, 196 for the locking mechanisms 160, 170, 190 may be pneumatic or gas shocks or springs, electromechanical actuators, mechanical springs, or other linear type actuator known to one skilled in the art.

The shape and size of storage compartments 30, 100 along with the seat configuration and covers may be different. The primary storage 100 may have a greater volume than the under seat storage 30. The concept may be equally applicable to any saddle type vehicle 10 no matter number of wheels, and the functions of access to these locations could also be performed manually via mechanical lock mechanisms in place of solenoids, and where the operator's manual action may push the seat 28 rearward as well as rotate the seat 28 to access the secondary storage 30. Similarly, the storage compartment cover 100 may be manually opened to access the storage compartment 100.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed:

1. A saddle type vehicle comprising:
   a first storage compartment formed above a battery housing, wherein the first storage compartment includes a cover and a first locking mechanism that has a first locked configuration and a first unlocked configuration; and
   a seat positioned rearward of the first storage compartment, wherein a quick charge electrical port is located under the seat, wherein the seat has a second locking mechanism that includes a second locked configuration and a second unlocked configuration, wherein when the second locking mechanism is in the second unlocked configuration, the seat is moved rearward allowing the quick charge electrical port to be accessible;
   wherein the second locking mechanism includes a first seat locking assembly that controls a first unlocked stage and a second seat locking assembly that controls a second unlocked stage, wherein the first unlocked stage allows access to the quick charge electrical port, and wherein the second unlocked stage allows access to the quick charge electrical port and a second storage compartment located underneath the seat; and
   wherein when the first seat locking assembly is unlocked, the seat is allowed to slide a predetermined distance rearward to provide access to the quick charge electrical port.

2. The saddle type vehicle of claim 1, wherein the first seat locking assembly includes a first seat latch solenoid, a first seat latch, and a first seat actuator, wherein the first seat latch engages the seat, and the first seat latch solenoid controls the first seat latch.

3. The saddle type vehicle of claim 2, wherein when the first seat latch is moved from the second locked configuration to the first unlocked stage of the second unlocked configuration, the first seat latch is released from the first seat latch solenoid, and the first seat actuator pushes the seat along a plurality of rails to expose the quick charge electric port.

4. The saddle type vehicle of claim 1, wherein when the second seat locking assembly is unlocked, the seat is allowed to slide a distance greater than the predetermined distance to allow access to the second storage compartment.

5. The saddle type vehicle of claim 1, wherein the second seat lock assembly includes a second seat latch, a second seat latch solenoid, a latching door releasably engaged to the second seat latch, wherein the latching door releasably engages a front seat axle located a bottom surface of the seat, and a second seat actuator connected to the seat.

6. The saddle type vehicle of claim 5, wherein when the second seat lock assembly is moved from the second locked configuration to the second unlocked stage of the second unlocked configuration, the second seat latch solenoid releases the seat second latch, wherein the latching door releases the front seat axle and the second seat actuator exerts a force on the seat.

7. The saddle type vehicle of claim 6, wherein the second seat actuator causes the seat to rotate upwards around a pivot axis located near a rear end of the seat.

8. The saddle type vehicle of claim 7, wherein the second locking mechanism is moved from the first locked configuration to the first unlocked configuration using a remote electronic device, such that the saddle type vehicle communicates wirelessly with the remote electronic device.

9. The saddle type vehicle of claim 1, wherein when the first locking mechanism is in the first unlocked configuration, the cover rotates about a cover hinge axis to allow access to the first storage compartment.

10. The saddle type vehicle of claim 9, wherein the first locking mechanism includes a storage latch pin, a storage latch solenoid, a storage actuator, a cover hinge, and a mounting plate.

11. The saddle type vehicle of claim 10, wherein when the first locking mechanism is moved from the first locked configuration to the first unlocked configuration, the storage latch solenoid releases the storage latch pin and the storage actuator pushes on a hinge plate of the cover hinge to rotate the cover about the cover hinge axis.

12. The saddle type vehicle of claim 11, wherein the first storage compartment is moved from the first locked configuration to the first unlocked configuration using a remote electronic device, such that the saddle type vehicle communicates wirelessly with the remote electronic device.

13. An electric saddle type vehicle comprising:
    a seat support structure;
    a seat positioned above the seat support structure, wherein a quick charge electrical port is located below the seat, wherein the seat has a first locking mechanism that includes a first locked configuration and a first unlocked configuration; and
    wherein the first locking mechanism includes a first seat locking assembly that controls a first unlocked stage and a second seat locking assembly that controls a second unlocked stage, wherein the first unlocked stage allows access to the quick charge electrical port, and wherein the second unlocked stage allows access to the quick charge electrical port and a storage compartment located underneath the seat; and
    wherein when the first seat locking assembly is unlocked, the seat is allowed to slide a predetermined distance rearward to provide access to the quick charge electrical port.

14. The electric saddle type vehicle of claim 13, wherein the first seat locking assembly includes a first seat latch solenoid, a first seat latch, and a first seat actuator, and wherein the first seat latch engages the seat, and the first seat latch solenoid controls the first seat latch.

15. The electric saddle type vehicle of claim 14, wherein when the first seat latch is moved from the first locked configuration to the first unlocked stage of the first unlocked configuration, the first seat latch is released from the first seat latch solenoid, and the first seat actuator pushes the seat along a plurality of rails to expose the quick charge electric port.

16. An electric saddle type vehicle comprising:
    a storage compartment formed above a battery housing, wherein the storage compartment includes a cover, wherein the storage compartment has a first locking mechanism that has a first locked configuration and a first unlocked configuration;
    wherein the first locking mechanism includes a storage latch pin, a storage latch solenoid, a storage actuator, a cover hinge, and a mounting plate, wherein when the first locking mechanism is moved from the first locked configuration to the first unlocked configuration, the storage latch solenoid releases the storage latch pin and the storage actuator pushes on a hinge plate of the cover hinge to rotate the cover upward about a cover hinge axis; and a seat positioned rearward of the storage compartment, wherein a quick charge electrical port is located under the seat, and wherein the seat has a second locking mechanism that includes a second locked configuration and a second unlocked configuration; wherein the second locking mechanism includes a first seat locking assembly that controls a first unlocked stage and a second seat locking assembly that controls a second unlocked stage, wherein the first unlocked stage allows access to the quick charge electrical port, and wherein the second unlocked stage allows access to the quick charge electrical port; and wherein when the first seat locking assembly is unlocked, the seat is allowed to slide a predetermined distance rearward to provide access to the quick charge electrical port.

17. The electric saddle type vehicle of claim 16, wherein the storage compartment is moved from the first locked configuration to the first unlocked configuration using a remote electronic device, such that the electric saddle type vehicle communicates wirelessly with the remote electronic device.

* * * * *